United States Patent [19]
Iida et al.

[11] Patent Number: 5,241,482
[45] Date of Patent: Aug. 31, 1993

[54] MONITORING SYSTEM FOR AUTOMATED ASSEMBLIES

[75] Inventors: Kouji Iida, Suzuka; Masanori Turuta, Yokkaichi; Kouji Tanaka, Sayama; Yoshinori Ishihata, Suzuka, all of Japan

[73] Assignee: Honda Giken Kogyo Kabushiki Kaisha, Tokyo, Japan

[21] Appl. No.: 677,239

[22] Filed: Mar. 29, 1991

[30] Foreign Application Priority Data

| Apr. 13, 1990 | [JP] | Japan | 2-98665 |
| Apr. 13, 1990 | [JP] | Japan | 2-98666 |
| May 2, 1990 | [JP] | Japan | 2-116255 |
| May 17, 1990 | [JP] | Japan | 2-127190 |
| May 17, 1990 | [JP] | Japan | 2-127191 |
| May 21, 1990 | [JP] | Japan | 2-130826 |
| Aug. 23, 1990 | [JP] | Japan | 2-222276 |
| Aug. 24, 1990 | [JP] | Japan | 2-223611 |

[51] Int. Cl.$^5$ .............................. G06F 15/46
[52] U.S. Cl. ........................ 364/468; 364/138; 364/188; 364/552; 340/825.06
[58] Field of Search .............. 364/468, 474.11, 188, 364/138; 371/552, 29.1; 340/717, 825.05, 825.06, 715

[56] References Cited

U.S. PATENT DOCUMENTS

| 4,635,184 | 1/1987 | Schuss | 364/187 |
| 4,709,337 | 11/1987 | Knapp et al. | 364/468 |
| 4,841,431 | 6/1989 | Takagi et al. | 364/187 |
| 5,006,976 | 4/1991 | Jundt | 364/184 |
| 5,077,674 | 12/1991 | Tischler et al. | 364/468 |
| 5,086,397 | 2/1992 | Schuster et al. | 364/468 |
| 5,088,045 | 2/1992 | Shimanaka et al. | 364/468 |
| 5,134,574 | 7/1992 | Beaverstock et al. | 364/551.01 |

FOREIGN PATENT DOCUMENTS 56-29282 7/1981 Japan .
63-282504 11/1988 Japan .

Primary Examiner—Jerry Smith
Assistant Examiner—Paul Gordon

[57] ABSTRACT

An automated production line monitoring system is presented to provide; setting and control of process parameters necessary to operate the various automated processing machine units installed on the line; and surveillance of abnormalities which may occur in the line. The line operator, working in a centralized CRT display and control center, monitors CRT screens showing: an operational preparation display consisting mostly of output signals from various sensors; an operational mode display showing a table of control switches; an interlock display showing various interlocked machine units; a product-type display showing processing steps to be performed on current product; an abnormality list display showing causes of various abnormalities on the line; a status display showing the operating conditions of various machine units; step monitor display showing the sequential step numbers of a production cycle; unit stepping display showing the details of the respective steps shown in the unit stepping display. The operator is able to control the operation of the entire line from the monitoring center by examining relevant displays and rapidly identifying causes of problems on the CRT screen.

20 Claims, 22 Drawing Sheets

FIG. 9

| PRODUCT TYPE | | | | | |
|---|---|---|---|---|---|
| STATION | CODE | PRODUCT TYPE | DESTI-NATION | MATERIAL | NOTE |
| T/r··· | C4 | SH4 | DOMESTIC | Zn | |
| 1 S T··· | C3 | SH3 | DOMESTIC | Cr | |
| 2 S T··· | C5 | SH5 | FOREIGN | Zn | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |

T-TNFB TRIP
HYDRAULIC PRESSURE/ TEMPERATURE ABNORMAL

FIG.10

| PRODUCT TYPE | | | | | | | | | | | | | | | | | | | | | | | | | |
|---|---|---|---|---|---|---|---|---|---|---|---|---|---|---|---|---|---|---|---|---|---|---|---|---|---|
| STATION | CODE | TYPE | DERIVATION | MATERIAL | REMARKS | | | | | | | | | | | | | | | | | | | | |
| T/r ···· | C4 | SH4 | DOMESTIC | Zn | | | | | | | | | | | | | | | | | | | | | |
| 1ST ···· | C4 | SH4 | FOREIGN | Zn | | | | | | | | | | | | | | | | | | | | | |
| 2ST ···· | C3 | SH3 | DOMESTIC | Cr | | | | | | | | | | | | | | | | | | | | | |

110 — STATION
111 — T/r, 1ST, 2ST
112 — CODE
113 — C4, C4, C3
114 — TYPE
115 — SH4, SH4, SH3
116 — DERIVATION
117 — DOMESTIC, FOREIGN, DOMESTIC
118 — MATERIAL
119 — Zn, Zn, Cr

T-TNFB TRIP

HYDRAULIC PRESSURE/
TEMPERATURE ABNORMAL

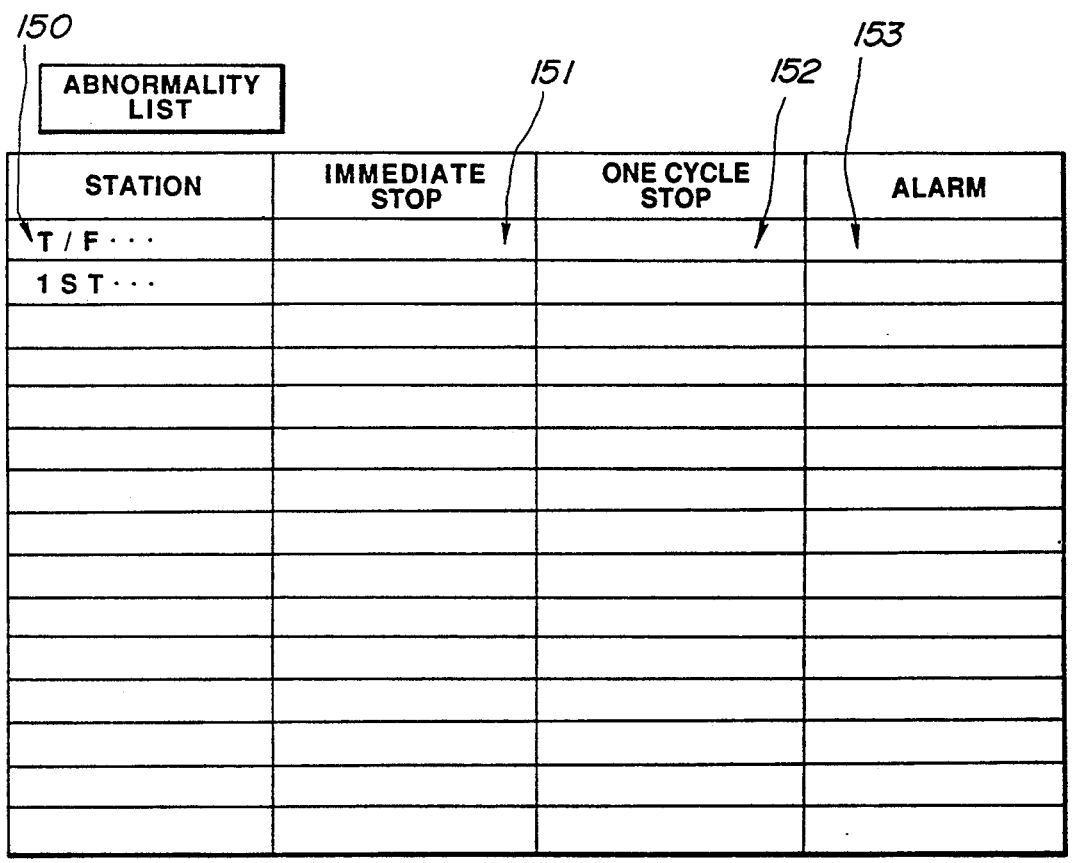

FIG.14

| 1 | 2 | 3 | 4 |

| ABNORMITY LIST | IMMEDIATE STOP | ONE CYCLE STOP | ALARM |
|---|---|---|---|
| | EMERGENCY STOP | TRANS-THERMO ABNORMAL | SEQUENCER BATTERY ABNORMAL |
| | SEQUENCER ABNORMAL | HYDRAULIC PRESSURE THERMO ABNORMAL | |
| | WELDING SOURCE ABNORMAL | MACHINE TYPE MISMATCH | |
| | CONTROL NFB TRIP | LUBRICATION ABNORMAL | |
| | PNEUMATIC DOWN | | |
| | SAFETY BAR LOCK | | |
| | LS ABNORMAL | | |
| | HYD. MOTOR OVER LOAD | | |
| | WELDING NFB. TRIP | | |
| | PB ABNORMAL | | |
| | SAFETY FENCE OPEN | | |

154 — (iv) immediate stop checkboxes
155 — (v) one cycle stop; (vii) checkbox row; (viii) checkbox row
156 — (vi) alarm; (ix) checkbox

FIG. 15

STATUS DISPLAY

| SET JIG | ORIGINAL POSITION | | ACTING POSITION | |
|---|---|---|---|---|
| | SOL | LS | SOL | LS |
| PROCESS 1 etc. ---- | *** | *** | *** | *** |
| PROCESS 2 etc. ---- | *** | *** | *** | *** |
| PROCESS 3 etc. ---- | *** | *** | *** | *** |
| PROCESS 4 etc. ---- | *** | *** | *** | *** |
| PROCESS 5 etc. ---- | *** | *** | *** | *** |
| GUN SHIFT ---- | | ○ | | |
| GUN SWING ---- | | ○ | | |
| WORK STARTS ---- | *** | *** | *** | *** |
| LOCATING PIN ---- | | ○ | | |
| COOLING WATER ---- | *** | *** | *** | *** |
| WORK CLAMP ---- | | | | |
| WORK PRESENT ---- | *** | *** | *** | *** |

| T/F | ORIGINAL POSITION | | ACTING POSITION | |
|---|---|---|---|---|
| | SOL | LS | SOL | LS |
| CAM PLATE ---- | | ○ | | |
| SWING-LOCK ---- | | ○ | | |
| EJECTOR ---- | *** | *** | | |
| MULTI-COVER ---- | | ○ | | |
| CARRIER ---- | | ○ | | |
| LIFT ---- | | ○ | | |
| 1ST LOADER LIFT ---- | *** | *** | *** | |
| 1ST LOADER TURN ---- | | ○ | | |
| 1ST LOADER WITH WORK ---- | *** | *** | *** | |
| 2ST LOADER A LIFT ---- | | ○ | | |
| 2ST LOADER B LIFT ---- | *** | *** | *** | |
| 2ST LOADER WITH WORK ---- | *** | *** | *** | |

FIG. 16

| MSR JIG A |
|---|

| 158 | 208 |
|---|---|
| SK7 | 1057 |

Table (200):

| MSR JIG | ORIGINAL POSITION | | ACTING POSITION | |
|---|---|---|---|---|
| | SOL | LS | SOL | LS |
| JIG SLIDE | 610 | 10513 | 609 | 10514 |
| LOADING | | | | |
| CLAMP SWING | 516 | 10515 | 515 | 10516 |
| CLAMP | 518 | 10517 | 517 | 10518 |
| INDIRECT GUN SWING | 520 | 10519 | 519 | 10520 |
| INDIRECT GUN PRESSURIZATION | *** | *** | 521 | 10524 |
| CL-8 SWING | 524 | 10523 | 523 | 10524 |
| CLAMP SHIFT | 525 OUT | 10526 | 526 RETURN | 10525 |
| PRESENT WORK | *** | *** | *** | 10528 |
| LS1 | | 10530 | | |
| LS2 | | 10531 | | |
| LS3 | | 10532 | | |

206 — G071

Table (200):

| MSR JIG | ORIGINAL POSITION | | ACTING POSITION | |
|---|---|---|---|---|
| | SOL | LS | SOL | LS |
| JIG INDEX | | | | |
| A POSITION (SK7/8) | *** | *** | *** | 10553 |
| B POSITION (SH4/7) | *** | *** | *** | 10554 |
| C POSITION (SPARE) | *** | *** | *** | 10555 |
| INDEX STOPPER | 557 | 10556 | 556 | 10557 |
| MSR JIG CH COMPLETION | | 6561 | | |

FIG. 17

| HANGER TRANSFER | | | | | | |
|---|---|---|---|---|---|---|

Table 200:

| HANGER TRANSFER | ORIGINAL POSITION | | ACTING POSITION | |
|---|---|---|---|---|
| | SOL | LS | SOL | LS |
| TRANSFER | 1023 | 1021 | 1024 | 1022 |
| 1st HANGER | | | | |
| SWING | 770 | 10769 | 769 | 10770 |
| LIFT | 771 | 10772 | 772 | 10771 |
| CENTER PILLAR CLAMP | 774 | 10774 | 773 | *** |
| AIR PAD | 776 | 10776 | 775 | *** |
| LOCK | 778 | *** | 777 | 10778 |
| WITH WORK | *** | *** | *** | 10817 |
| 2nd HANGER | | | | |
| SWING | 786 | 10785 | 785 | 10786 |
| LIFT | 787 | 10788 | 788 | 10787 |
| CENTER PILLAR CLAMP | 790 | 10790 | 789 | *** |
| AIR PAD | 792 | 10792 | 791 | *** |
| LOCK | 794 | *** | 793 | 10794 |
| PRESENT WORK | *** | *** | *** | 10818 |

201 / 202 / 203 / 204 / 205

Table 207 (6081):

| HANGER TRANSFER | ORIGINAL POSITION | | ACTING POSITION | |
|---|---|---|---|---|
| | SOL | LS | SOL | LS |
| 3rd HANGER | | | | |
| SWING | 802 | 10801 | 801 | 10802 |
| LIFT | 803 | 10804 | 804 | 10803 |
| CENTER PILLAR CLAMP | 806 | 10806 | 805 | *** |
| AIR PAD | 808 | 10808 | 807 | *** |
| LOCK | 810 | *** | 809 | 10810 |
| PRESENT WORK | *** | *** | *** | 10819 |
| TT MAT-SWITCH DISCHARGE | | 10134 | | 3035 |
| MAT-SWITCH DISCHARGE | | 10859 | | 3036 |
| MAT-SWITCH SAFETY LIGHT | | 10860 | | 3036 |
| ELECTRIC TUBE | | 10569 | | 3038 |

201 / 202 / 203 / 204 / 205

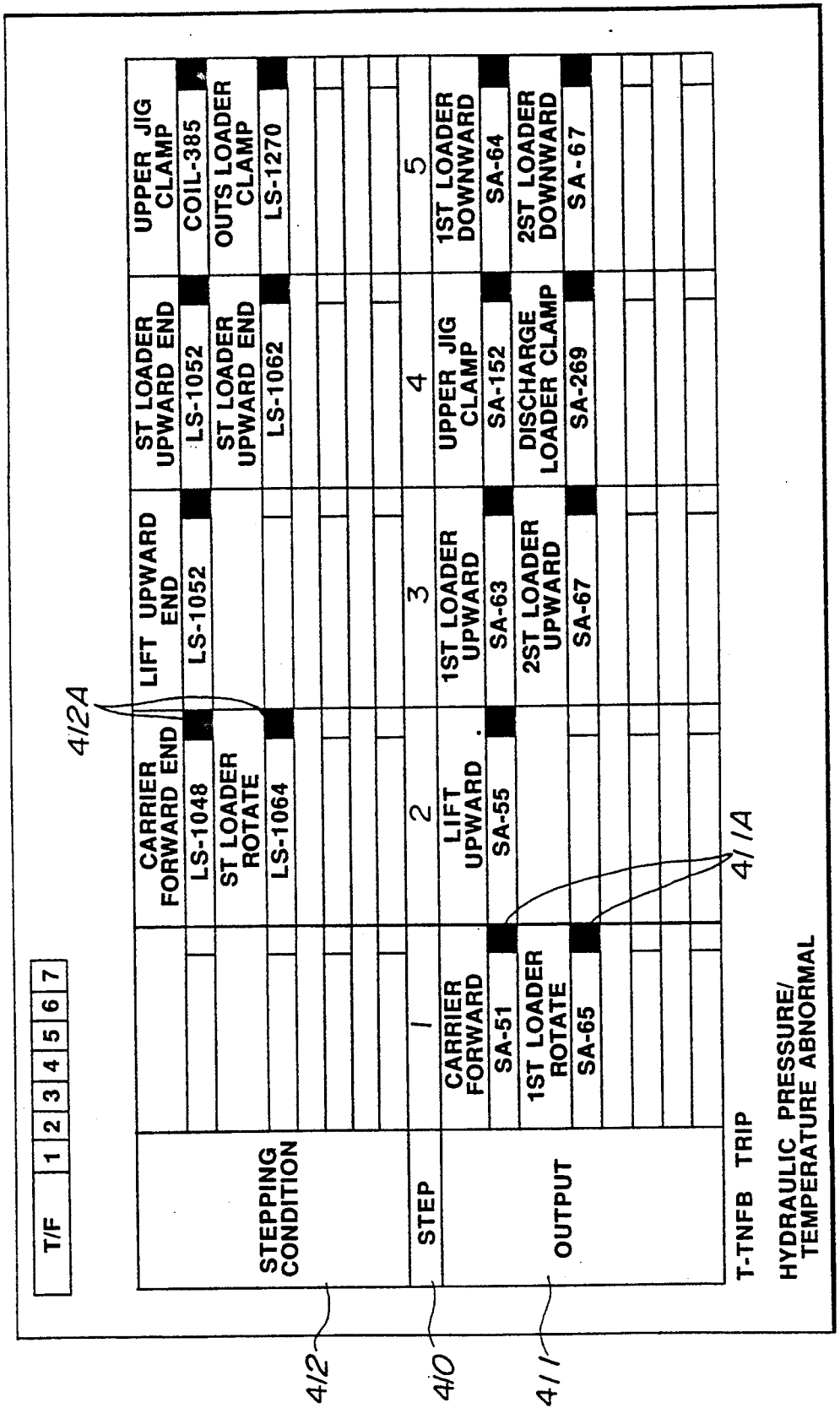

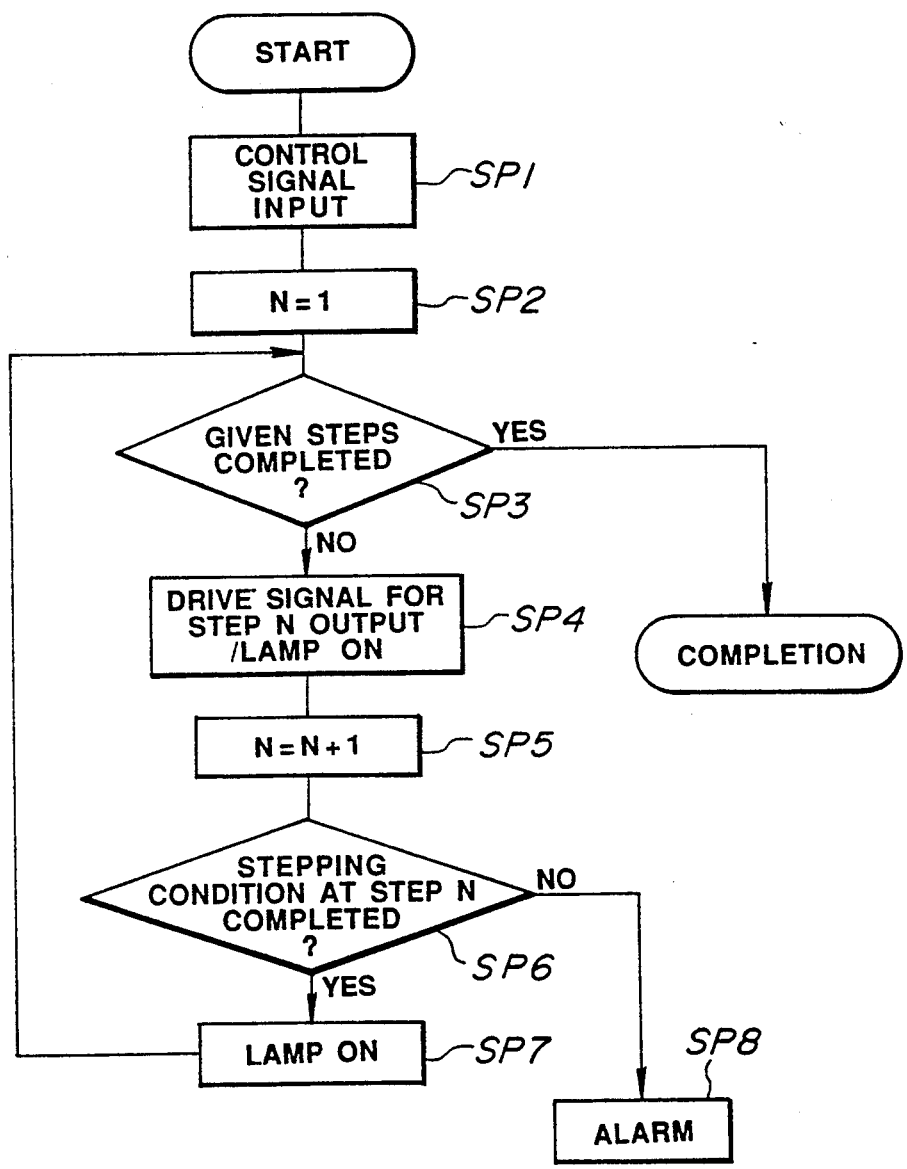

MONITORING SYSTEM FOR AUTOMATED ASSEMBLIES

FIELD OF THE INVENTION

This invention relates to a monitoring system for monitoring the operations of automated assembly line, particularly, it is concerned with efficient monitoring of a number of complex operating variables involved with the line, including emergency situations, by means of visual displays which can be easily followed by unskilled operators.

BACKGROUND ART

Of the many automated production lines, for exampled automobile assembly lines, require a large number of manufacturing steps throughout the flowing operations. In these steps, there are automated processing machineries such as robots to perform many specific activities.

It is necessary to determine the various modes (type of manufacturing activity) of operations of these processing machineries depending on the requirements of the process or of the object to be manufactured.

Further, in such automated production lines as the automobile assembly lines which encompass a large number of different operations, it is imperative that not only the process operations be monitored but also that any unusual operating conditions be detected and dealt with promptly.

In recent years, there has been a tendency for the number of processing steps to increase even more along with the expanded capability of process control computers. Consequently, along with the increase in the number of steps requiring control, the complexity of the control actions has increased. This has led to a new requirement for an effective monitoring system which can be used by an operator irrespective of his familiarity with the total complex operating system.

In the past, techniques for such directive systems have been disclosed in such patent as JP-B2-56-29282 or patent application as JP-A-63-282504.

The Patent JP-B2-56-29282 discloses a technique of displaying the operative sequences of the step required for an automated control system by means of corresponding indicator lights.

The Patent Application JP-A-63-282504 discloses a technique for displaying the necessary steps for operating the CRT display of a control computer.

Such known techniques are not suitable for the involved process control systems such as automobile assembly lines, because there are numerous requirements for defining operational modes of the control devices themselves in addition to the controls for a large number of automatic machineries present in the production lines. The reasons are explained below.

(1) It is difficult to let the controller recognize the relevant information easily and speedily from among a multitude of information related to a multitude of machineries.

(2) Setting of the control functions related to the multitude of machineries is cumbersome.

(3) The setting of the control functions is meaningful only when conditions for successful operation are known beforehand. If such information is lacking, the lines may not operate satisfactorily even if control function are entered.

(4) According to the existing techniques, it is not possible to pinpoint the source of problems and alert the operator and inform him of the correct procedure to deal with the problem.

SUMMARY OF THE INVENTION

An objective of the present invention is to let the control operator easily recognize the various information related to an automated line having a large number of machines operating under complex limits as well as a variety of operational modes.

Further objective of the present invention is to simplify and facilitate setting of operational controls.

The present invention is applicable to an automated production line which is designed to handle a flow of products passing through a number of processing stations, which house automated mechanisms which perform a series of manufacturing steps. Such a line is typically an automobile assembly line.

The monitoring system of the present invention comprises: detection means provided on each of the machines located on automated production lines to detect the operational status of the various machines; display means to exhibit the information forwarded from the sensing means; and control means to control the operational status of the various machines according to the status report exhibited by the display means.

The display means comprises a group surveillance screen which surveys the entire production line; a status display screen which displays the operating status of the various automated machines in the line; a step monitor display screen which displays the step number of a sequential operation which is being carried out by the automated machine, such as fabricating or assembly robot; and a unit stepping screen which lists the actual contents of the step currently in progress on the machine.

The status display screen is able to be switched from one operation to another shown in the group surveillance screen by activating a first switching means.

The step monitor display screen is able to be switched from one operation to another by a second switching means.

The unit stepping screen is able to be switched from one operation to another by a third switching means.

According to this invention, the group surveillance screen permits easy recognition of the operating status of the various machines and permits simplification of the procedure for setting of operating parameters, by means of the various monitoring screens, such as operational preparation display screen, mode display screen, interlock display screen, product type display screen, abnormality list screen to provide an effective visual guide to remote happenings.

Further, by operating the first switching means, it is possible to switch quickly from the group surveillance screen to a status display screen of any machine to check its operational status.

Accordingly, if a problem, for example, is indicated by the group surveillance display, the operator is able to switch the screen quickly to the actual problem spot of the machine to examine the problem closely and to make appropriate decisions.

Further, by operating the second switching means to change the display from the status display screen to the step monitor display screen, the source of the problem can be examined more closely to compare the progress of the steps in terms of the step number assigned t each of the steps in order to assess possible reason for the problem.

By operating the third switching means the step monitor screen can be switched to the unit stepping screen, which lists the actual sequential contents of the operation, in order to easily recognize the abnormality in the sequence.

Therefore, the present invention provides a logical and simple procedure for pinpointing the source of a problem by changing the displayed information from a screen in the group surveillance display to a status display screen, progressively, then to a step monitor display screen, thence to a unit stepping screen to probe deeper into the source of the problem.

BRIEF DESCRIPTION OF THE DRAWINGS

FIG. 9 is front view of the product type display screen.

FIG. 10 is a front view of an updated page of the product-type display screen shown in FIG. 9.

FIG. 13 is a front view of the abnormality list display screen for the entire line.

FIG. 14 is a front view of the abnormality list display screen for individual line.

FIG. 15 is a front view of the status display screen for the SET jig.

FIG. 16 is a front view of the status display screen for the MSR jig.

FIG. 17 is a front view of the status display screen for the hanger transfer device.

FIG. 20 is a front view of the unit stepping display screen.

FIG. 21 is a flow chart to show the controlling steps of the step monitor display screen.

DETAILED DESCRIPTION OF THE INVENTION

The following is a preferred embodiment of applying the monitoring system to automated production in an automobile assembly line.

The automated production line (hereinafter referred to as the line, including assembly and production lines in which actions flow in a sequence of operations) considered here is one which is designed to handle a flow of products moving from upstream to downstream and passing through a number of processing stations in which a series of machine units are located to perform production tasks.

Figure 1:
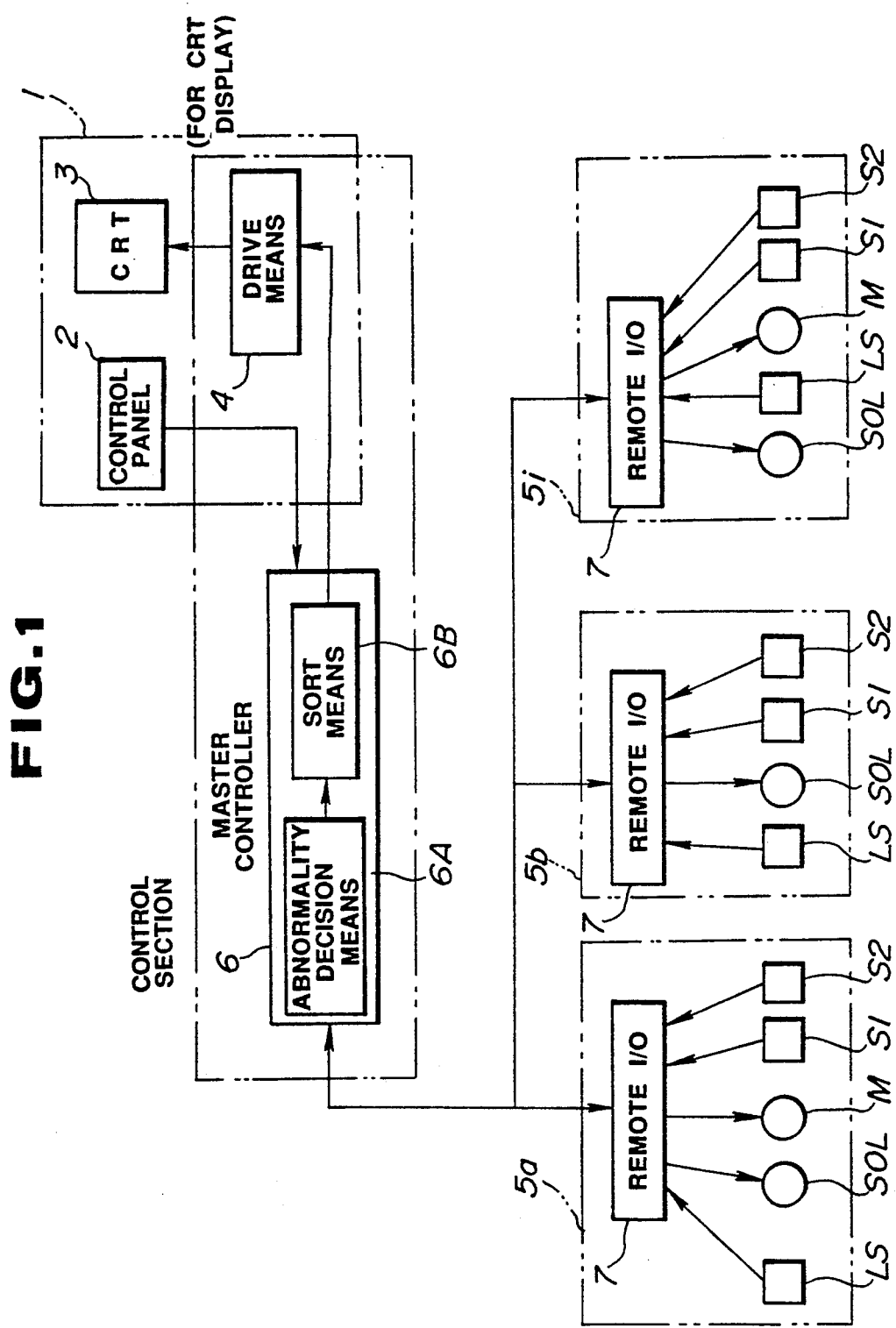
FIG. 1 shows a block diagram for the controlling elements of the monitoring system for automatic production line.

FIG. 1 is block diagram showing the overall constitution of the monitoring system.

In FIG. 1, numeral 1 denotes a display part, which consists essentially of: a control panel 2 of the control means which issues commands such as mode setting, changing of screen displays; a display screen CRT 3 of the display means; and a drive means 4 for the CRT 3.

The command signal from the control panel 2 is transmitted to a master controller CPU 6 which controls a number of automated machine units, 5a, 5b and so on to 5i (hereinafter referred to as machine units 5a-5i), which are provided in every station (ST) of the automated production line.

The CPU 6 is equipped with an abnormality detection means 6A to detect the presence of abnormalities in the line, and, working in conjunction with a sort means 6B, to classify various abnormalities according to the degree of severity as determined by the detection means 6A.

The CPU 6 transmits the command signals it receives from the control panel 2 to each of the automated machine units, 5a-5i, and processes the data from each of the machine units 5a-5i, and forwards the processed data to CPU 4 to be displayed on the CRT 3.

The machine units 5a-5i variously represent such group of machines as conveyors for transporting parts for assembly, and industrial robots (referred to as automated processing machines or processing machines hereinafter) for performing such manufacturing tasks as handling, sealing, welding, painting operations.

Further, the automated mechanisms (referred to as automated mechanisms or mechanisms hereinafter) within each of the machine units 5a-5i respond to the commands issued by CPU 6.

The mechanisms are equipped with various component parts such as motor M as a driving power source, solenoids SOL to control oil or air pressures, limit switches LS to provide distance-based actions, and other types of sensors S1 to provide data for controlling relevant actions. Each of the component parts is provided with remote I/O ports 7 so as to be able to communicate with the master controller CPU 6.

The machine units 5a-5i are equipped with sensors $S_2$ (sensing means) to monitor the status of the voltage and pressure sources, and the results of checks are forwarded to CPU 6 to determine their normalcy.

Further, the data generated by the various sensors $S_2$ such as signals regarding the operational status and emergency situations, including emergency stop switch (not shown), provided in the line are also forwarded to CPU 6.

The CPU 4 is provided primarily to operate CRT 3 according to controlling commands of the CPU 6, but it can also perform supplemental control function of CPU 6.

The CPU 6 provides emergency and critical control functions according to input sensor signals from emergency stop sensors, limit switches LS and sensors $S_1 \cdot S_2$.

The CPU 6 also controls display functions of emergency information based on the sensor signals (such as "emergency stop", "hydraulic) motor overload", "sequencer abnormal", "welding NFB trip", etc.). Having determined the type of emergency according to detection means 6A, CPU 6 then further classifies this information according to sort means 6B, and displays the problem step in the relevant display portion on CRT 3.

The following description refers to display controlling actions of CPU 6 for various mechanisms assigned to machine units 5a–5i.

The sequence of events for CPU 6 is:

(1) input signals from control panel 2 are entered;

(2) based on the signal above, command signals are issued to operate relevant processing machines of the machine units 5a–5i (arms, welding/painting operations, clamps etc.), that is, the signals to activate corresponding motor M, solenoid SL etc. of the machine units 5a–5i;

(3) input signals are entered from sensors S and limit switches SL to identify the location of the relevant mechanisms of the machine units 5a–5i;

(4) output signals, according to event (2) above, are sent to CPU 4 to display which components (motor M and solenoid SOL) of the machine units 5a–5i have been activated;

(5) output signals, according to event (3) above, are sent to CPU 4 to display which sensors (sensor S, limit switches SL) of the machine units 5a–5i have been activated.

Figure 2:
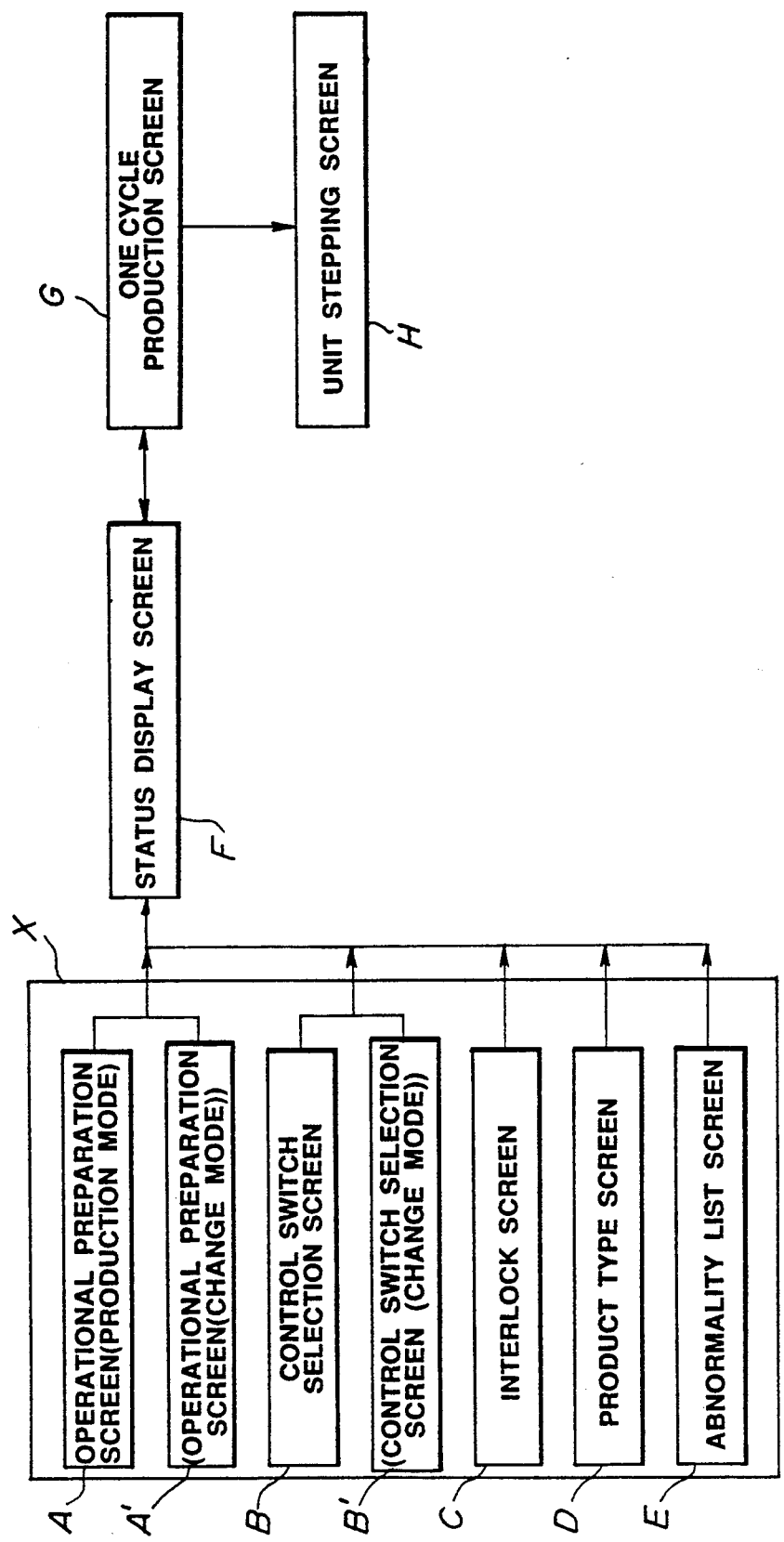
FIG. 2 is a block diagram to show the display elements of the display means of the monitoring system.

FIG. 2 refers to the basic organization of the display means of the information generated by the control means explained in FIG. 1.

The display means consists primarily of:

(1) a group surveillance screen X of the line;

(2) a status display screen F to monitor the operation of the machine units distributed along the line;

(3) a one cycle display screen G to show the step number in the automated sequential operation being carried out by the processing or assembling mechanisms provided in the line;

(4) a unit stepping screen H to show the actual steps of the operation indicated by the screen H.

The displays in the above screens can be switched from one to another by means of the switching means as follows.

The status display screen F is obtained from among the various displays A to E in the group surveillance display X by means of the first switching means.

The production display G is obtained from the status display screen F by means of the second switching means.

The unit stepping display screen H is obtained from the one production cycle display screen G by means of the third switching means.

Group surveillance display screen X

The configuration of the group surveillance display screen X are explained in the following.

(1) Operational preparation screens A, A' which display electrical power status, conditions required in preparation to start-up of the line, conditions required in order to operate the line and allowable automated operations.

(2) Operational mode display screens B, B' which display a summary of corresponding switches for controlling the operational modes of each of the automated machine units.

(3) An interlock display screen C which displays a summary showing interlocked processing machines in terms of the various machine units.

(4) A product-type display screen D which permits selection of operational mode and operational conditions required for each of the machine units.

(5) An abnormality list display screen E which displays a summary abnormality list identifiable according to manufacturing steps of the non-operative machine units 5a–5i.

Next, the details of the group surveillance displays are explained in reference to drawings. The wording shown in the figures appear on the screen, and the expression lightup/litup includes such actions of changing: display contrast (e.g. adjusting of brightness/contrast), reversal of display/ background (e.g. white background to dark background), color tone (e.g. red to green).

Operational Preparation Display Screen A

Figure 3:
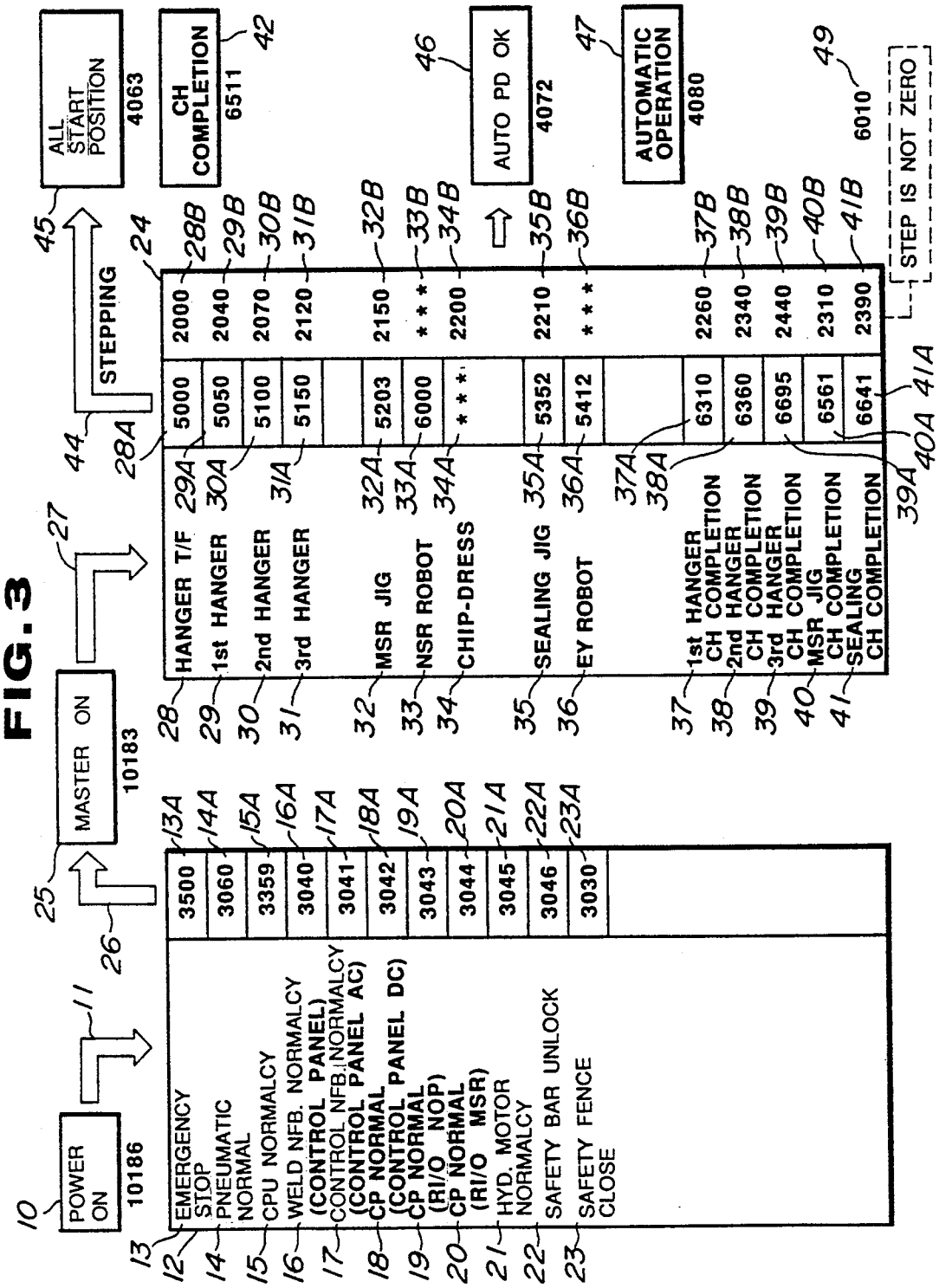
FIG. 3 is a front view of the operational preparation screen.

FIG. 3 shows the operational preparation display screen A. The numeral 10 refers to the power source indicating part which is litup by turning on the power source. This power source indicating part 10 is litup by turning on the power source and the switch (not shown) on the control panel 2.

When the operational preparation conditions are fulfilled, the arrow-shaped directives portion 11 (hereinafter referred to as arrow 11) is litup. The arrow 11 points to the column 12 of lines showing condition necessary for preparation of line startup. This column 12 shows the necessary conditions 12–23, such as "emergency stop" and "pneumatic normal", which are necessary conditions for startup of the line. At the end of each line is a display portions 12A to 23A which are litup when the respective condition is satisfied.

Opposite to the operational conditions display column 12 is a startup condition display column 24, and a directive display portion 25 in the middle of the two columns to prompt the operator's eyes to the next step of preparation.

The display portion 25 shows the wording "Master On" which is surrounded by a set of arrow-shaped directives portions 26, 27 (simplified as arrows 26, 27) joining the two columns of operational conditions display column 12 and the startup conditions display column 24.

The directive display portion 25 and directives portions 26–27 are litup when all the necessary conditions specified in the operational condition display column 12 are fulfilled to inform the operator that he should now proceed to the next step.

Accordingly, when the operator presses the button (not shown) located on the control panel 2 to issue command to commence line startup, the directive display portion 25 begins blinking to indicate that it is being readied, and lights up to indicate the next step.

The startup condition display column 24 shows identifications 28–41 of the various machines provided for each of the machine units and corresponding display portions 28A–41A to indicate that the mechanisms are back to their original positions and are ready to repeat the same cycle.

This is because a cycle involves the time for the mechanism to return to its original position through the activation of solenoids and others, in addition to the assigned manufacturing time.

Therefore, when a mechanism is in the process of stepping to the original position, the display so indicates by blinking. Additionally in this preferred embodiment, there is an indicating portion 42 to show that all the mechanisms have returned to their original positions.

When the display shows that all the mechanisms shown in the startup condition display column 24 have returned to their original positions, through the confirmation provided by the limit switches and sensors on each machine unit, said indicating portion 42 becomes litup, along with the arrow 44 and the display portion 45 which displays wording "All Start Position". This indicates to the operator that he can now set various mode settings by turning on the corresponding switches.

Under the condition that the display portion 42 is litup with the words "All Start Position", it becomes possible to set up operational mode of the various machine units by turning the switches (not shown) provided on the control panel 2.

At this stage, the screen changes over, either automatically or manually by a screen changeover switch on the panel 2 (not shown), from operational preparation display screen A shown in FIG. 3 to operational mode display screen B. The details of this screen B will be given later.

When the settings of the operational modes, shown in the operational mode display screen B, are completed the display returns to operational preparation display screen A shown in FIG. 2. The change over of the operational mode display screen B to operational preparation display screen A can be performed automatically or manually as before by the screen changeover switch (not shown) on the panel 2.

At this stage, the line start display portion 46, shown in the operational preparation display screen A shown in FIG. 2, becomes litup with the wording "Auto PD OK" which is a signal to inform the operator that the line is ready for startup by pressing of the button provided on the panel 2 (not shown).

When the line is started by the above procedure, the display portion 47 with the wording "Automatic Operation" becomes litup to inform the operator that the line is now active.

In this preferred embodiment, when the display portions 10, 13A-23A, 25, 28A-41A, 28B-41B, 42, 45-47 are not litup, the corresponding circuit number (which are four- or five-digit numbers in FIG. 3) will appear in the display box. For the display portions 10, 25, 42, 45-47, the space is reserved normally for wording to appear, therefore in FIG. 3, the circuit numbers which are shown below the space will appear if the wording does not appear.

Incidentally, the numeral 49 in FIG. 3 refers to a display number assigned to this particular information display which is Operational Preparation Display.

Operational Mode Display Screens B

Figure 4:
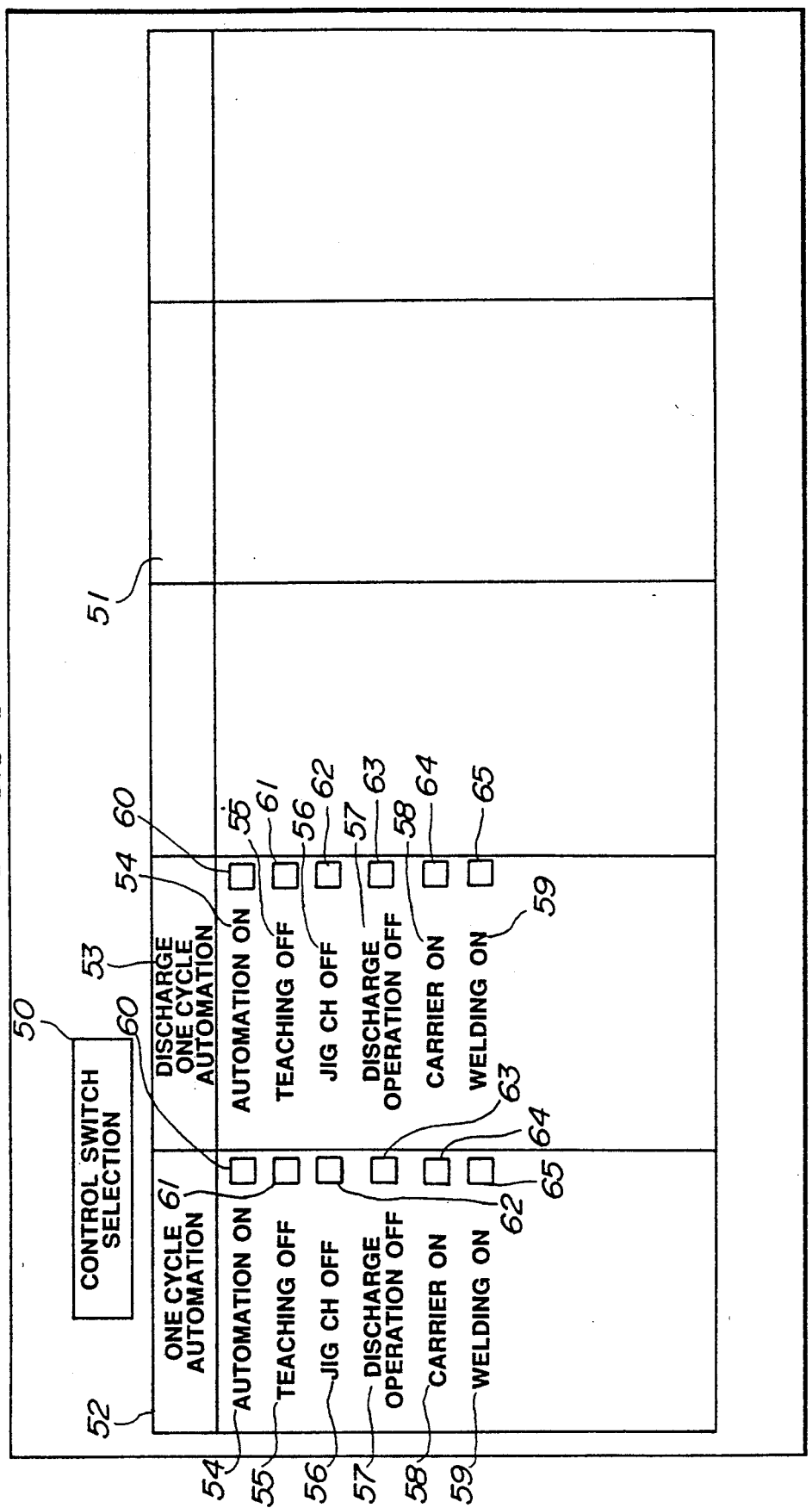
FIG. 4 is a front view of the operational mode screen.

FIG. 4 shows operational mode display screen B. In this display, there is a space 50 with wording "Control Switch Selection" to prompt a control switch selection for an operational mode and a space 51 for showing the name of the operational mode selected and the status of the respective switch.

In the space 51 are shown the following information.

(1) Display portions 52, 53 which display the name of the operational mode, "One Cycle Automation" and "Discharge One Cycle Automation" which is individually selectable by means of mode change switch.

(2) Display portions 54-59 which show the name of the particular switch within a given operational mode and its ON-OFF status.

(3) Operational status display portions 60-65 which lightup when the correct setting of the switches to correspond with the specified displays 54-59 are made by means of a selector switch (not shown).

In this embodiment, the difference between "One Cycle Automation" and "Discharge One Cycle Automation" is in the switch position being ON or OFF for the discharge operation. That is, the switches are for the purpose of determining whether the processed work object is to be forwarded to the next processing machines or to stay within the machine until after completion of one cycle.

When all the switches are set in their proper positions according to the instructions given by the specified displays 54-59 by means of the switch (not shown), then the status display portions 60-65 under the appropriate mode heading are litup.

At this time, automatically or manually, the display changes over to operational preparation display screen A to prompt the operator to begin startup by a changeover to "Auto PD OK" display portion 46 provided on said preparation screen. As a result, it becomes possible to activate the line by operating the button provided on the panel 2 (not shown).

Figure 5A:
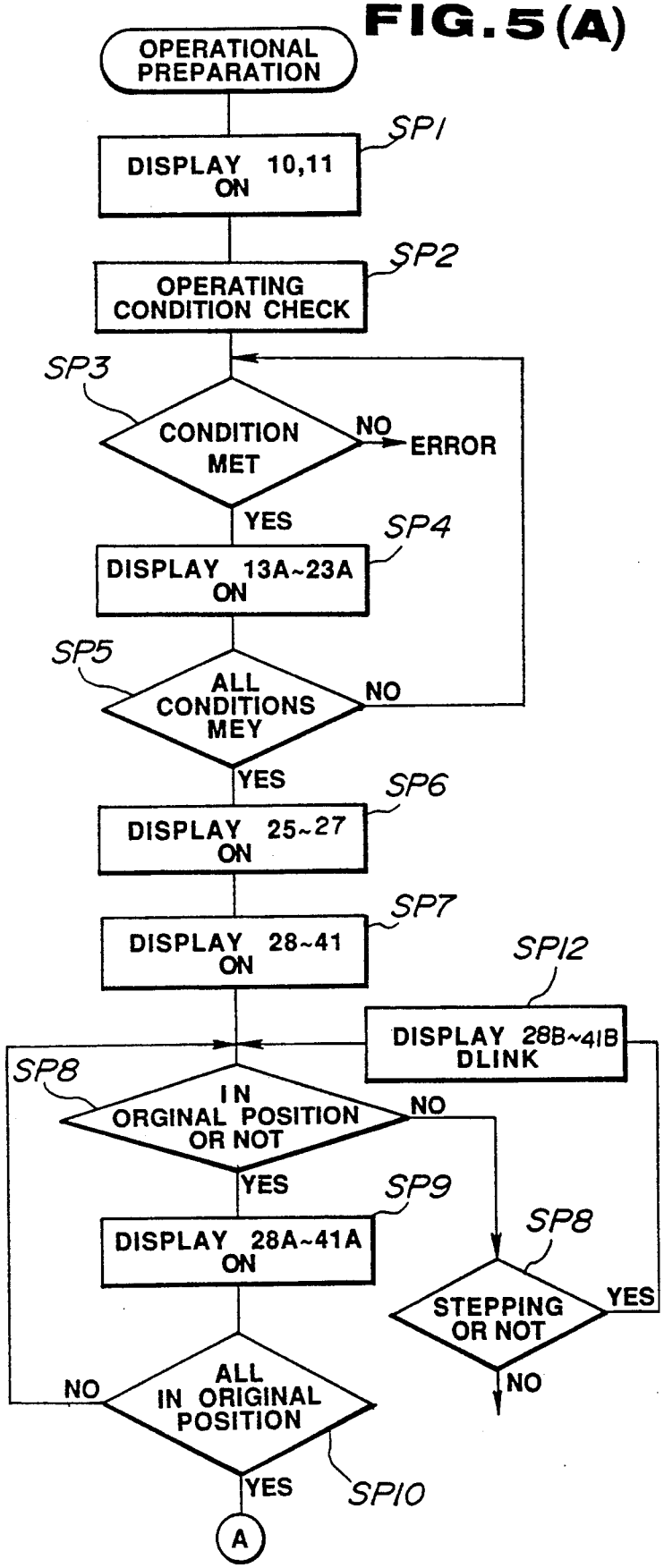
FIGS. 5 (A) and (B) are a flow chart to show the sequence of setting up the operational modes.
Figure 5B:
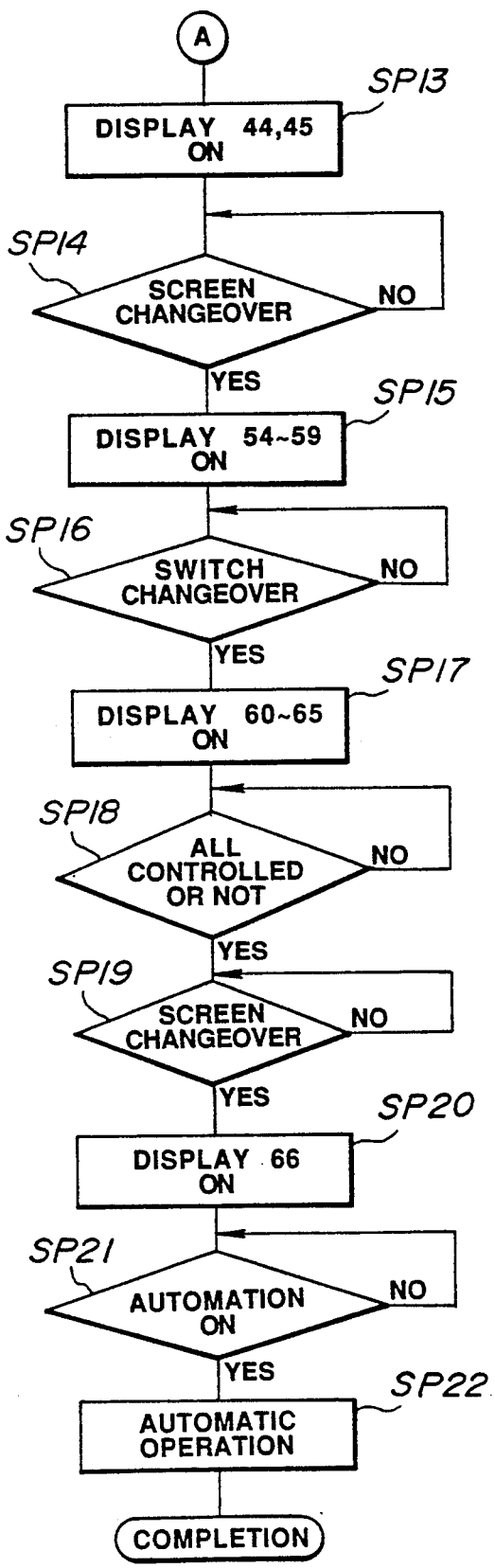

Next, the detailed steps of the controller CPU 4 and CPU 6 to carry out the above described display functions are explained with reference to the flow charts shown in FIGS. 5 (A) and (B).

Preparation for Automatic Operation

STEP 1

When the power is turned on, the display shown in FIG. 3 appears on CRT 3 screen with litup display portion 10 and the arrow 11, leading the operator's attention to the list of pre-operational check items in operational conditions display column 12.

STEP 2

The spaces 13-23 are filled with the names of the check items from the column 12, and their operational capability is examined and decided in sequence according to input data from the various sensors.

STEP 3

The first item 13 is checked for its normalcy, and if it is normal the path goes to STEP 4 while if it is not normal, the path opts to error. The error may activate an alarm and leads to inspection.

STEP 4

Every time an item is satisfied, one of the display portions 13A-23A is litup to inform the operator that the item is ready for its next step. When an item space is not litup, the circuit number corresponding to the item is displayed in the space. Maintenance staff enters this number in the sequence analyzer (not shown) designed to analyze the circuit conditions of the operational sequence circuit. This display is inactive while the display portions 13A-23A are litup and vice versa.

STEP 5

The path loops back to STEP 1 until all the conditions are fulfilled.

STEP 6

To prompt the operator to proceed to line startup preparation, the display portion 25 "Master On" as well as the directive display portions 26 and 27 are also litup. As in the previous case, if the display portion 25 does not litup, corresponding circuit number is entered in the space, so that the maintenance staff can check the circuit.

STEP 7

After the above display is turned on, the positioning of the various mechanisms 28-41 is checked to ascertain that they are in their original position based on the data from the various limit switches LS and sensors S, and as each item becomes satisfied, the mechanism name is displayed in the corresponding spaces 28-41.

STEP 8

The preparatory conditions of all the items are checked for their readiness for startup, and if the conditions are satisfied, the path proceeds to STEP 9. If they are not satisfied, for example because a jig is in the stepping process, the path opts to STEP 12 to display blinking signal in the corresponding space 28B-41B to indicate that the item is "stepping". If the item is not stepping, then the path goes to error, or the situation is corrected by way of Status Display Screen F or Step Monitor Screen G which will be described later.

STEP 9

Every time a mechanism is ready for startup the display space 28A-41A corresponding to the item name 28-41 is litup. Again, if it does not lightup, the circuit number appears in the space, so as to permit the maintenance staff to take action.

STEP 10

The path loops back to STEP 8 until all the jigs/mechanisms are confirmed to have returned to their original positions.

STEP 13

The operator is notified that the preparation steps for mode setting have been completed by lightup of the directive portion 44 and the display portion 45.

STEP 14

Manually or automatically upon satisfying of all the operational preparations, the display screen of the CRT 3 changes over to "Operational Modes" display shown in FIG. 4.

STEP 15

The name of the mode to be set up is entered in space 50 by a switch (not shown) to correspond with one of the items 54-59.

STEP 16

Each of the mode settings is checked to ascertain that they are set as specified by the display.

STEP 17

An item is litup Every time the settings are completed for the item as specified.

STEP 18

Idle until all the settings are completed.

STEP 19

Upon completion of the setting step, the screen returns, automatically or manually, to Operational Preparation display shown in FIG. 3.

STEP 20

The display portion 46 "Auto PD OK" is litup to indicate to the operator that the line is ready for startup.

STEP 21

Idles until the operator activates the "Startup" switch (not shown).

STEP 22

The line starts operating automatically under the conditions set up in the mode setting operation.

When a problem arises in the line, for example stopping of the line or abnormality indication, maintenance staff is able to identify the source of the problem by the unlit display space. Opposite to the unlit space, a circuit number is litup to show the circuit from which the problem originated. The maintenance staff is able to enter the number in the sequence analyzer to pinpoint the source of the problem.

Figure 6:
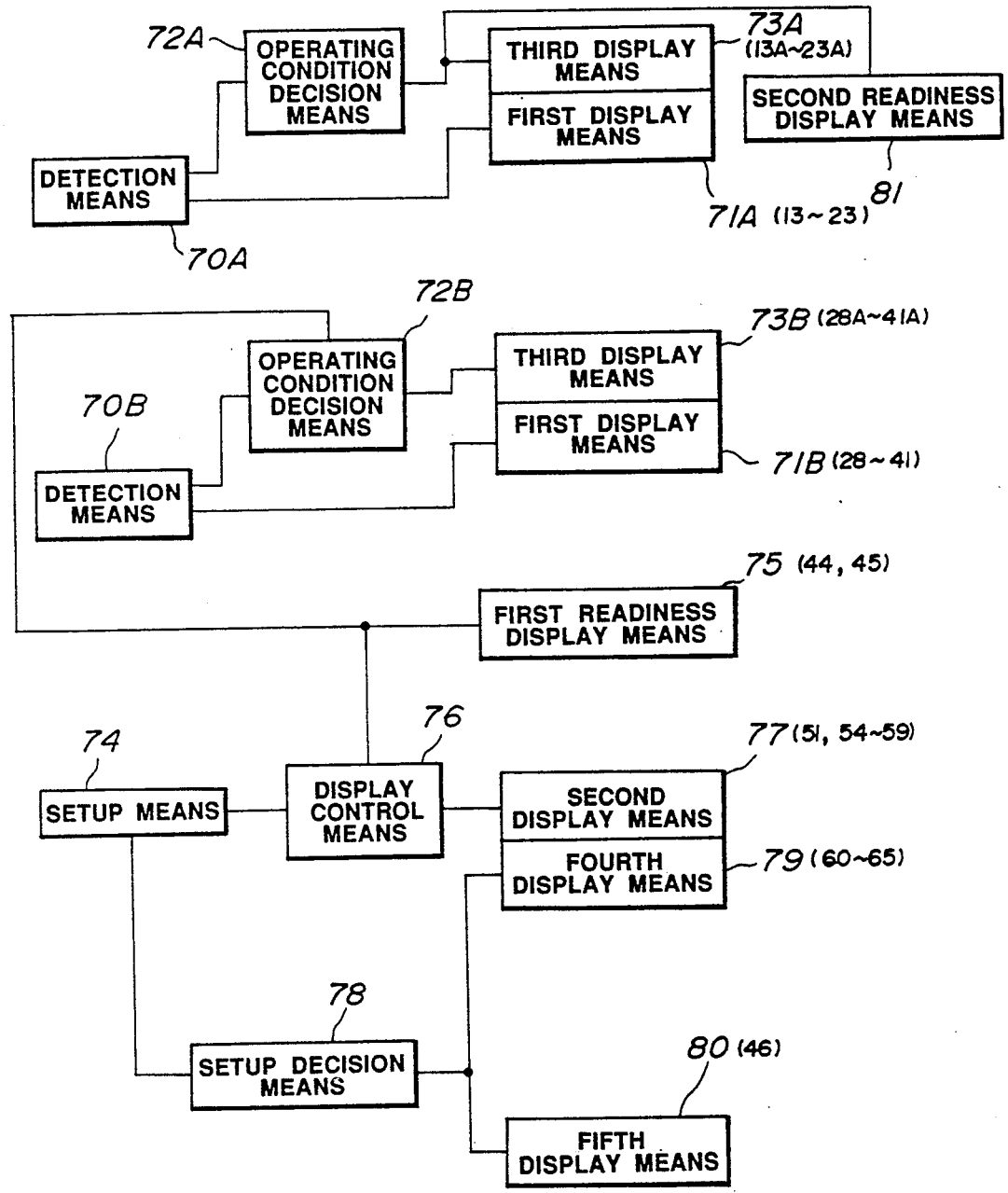
FIG. 6 is a block diagram to show the flow of functional steps of the operational preparation display screen and of the operational mode display screen.

FIG. 6 is a block diagram to show the flow of functional steps involved in setting of the operational mode of the line. The functions of the various mode setting steps are explained in the following with reference to FIG. 6.

In FIG. 6, the first detection means 70A and the second detection means 70B are directly related to all the parameters necessary, such as the data from the voltmeter, pressure gauge and limit switches, for setting the operational conditions/items shown in columns 12 and 24 of FIG. 3.

Therefore, the first display means 71A, connected to the first detection means 70A, corresponds with the displayed items 13-23 specified in the column 12 and those of the second display means 71B, connected to the second detection means 70B, with the displayed items 28-41 of the column 23.

The output data from the detection means 70A and 70B are judged to be either normal or abnormal by the analyzing functions of the operating condition decision means 72A and 72B provided within the controllers CPU 4 and CPU 6.

When said decision means 72A decides that the conditions are normal, the third display means 73A, which corresponds with display portions 13A-23A opposite the names 13 to 23, is litup. Likewise, when said decision means 72B decides that the conditions are normal, the third display means 73B, which corresponds with display portions 28A-41A opposite the designations 28-41, is litup.

Meanwhile, the function of said decision means 72B is to determine whether or not the system is ready for mode setting steps by the setup means 74 comprising various switches provided in the control panel 2. According to the judgements thus formed, the first readiness display means 75 activates lighting up of the directive display 44 and the display portion 45.

Meanwhile, when said decision means 72B decides that the pre-startup preparations are completed, the display control means 76 allows the second display means 77 to display the relevant mode content of the space 51, and correspondingly, the setup means 74 to display the relevant content of a switch designation 54-59.

The content of the setup means 74 is forwarded to setup decision means 78 within the CPU 6, thence to CPU 4. Every time the switch is set to a specified setting, the fourth display means 79 allows the relevant display portion 60-65 to light up.

Also, the contents of the setup means 74 is forwarded to setup decision means 78 within the CPU 6, from which the processed data are forwarded to CPU 4. Every time the switch is set to a specified setting, the fourth display means 79 allows the relevant display portion 60-65 to light up.

Further, when the setup decision means 78 decides that all the parameters are set up, the display portion 46 is litup to indicate to the operator that the line is ready for startup.

In FIG. 6, the block diagram shows two groups of detection means, 70A for establishing preparation conditions, and 70B for establishing setup conditions. When the preparation conditions are fulfilled, the operator is notified, and at the same time, the directive portions 26 and 27 are litup to draw the attention of the operator to the setup conditions which will be displayed on the display portion 25.

In these cases it should be noted that the display means is not necessarily restricted to CRT displays but liquid crystal displays with corresponding LEDs.

Further, the layout of the instruction displays shown in FIGS. 3 and 4 need not be restricted to those exhibited in this particular example.

Interlock Display Screens C

Figure 7:
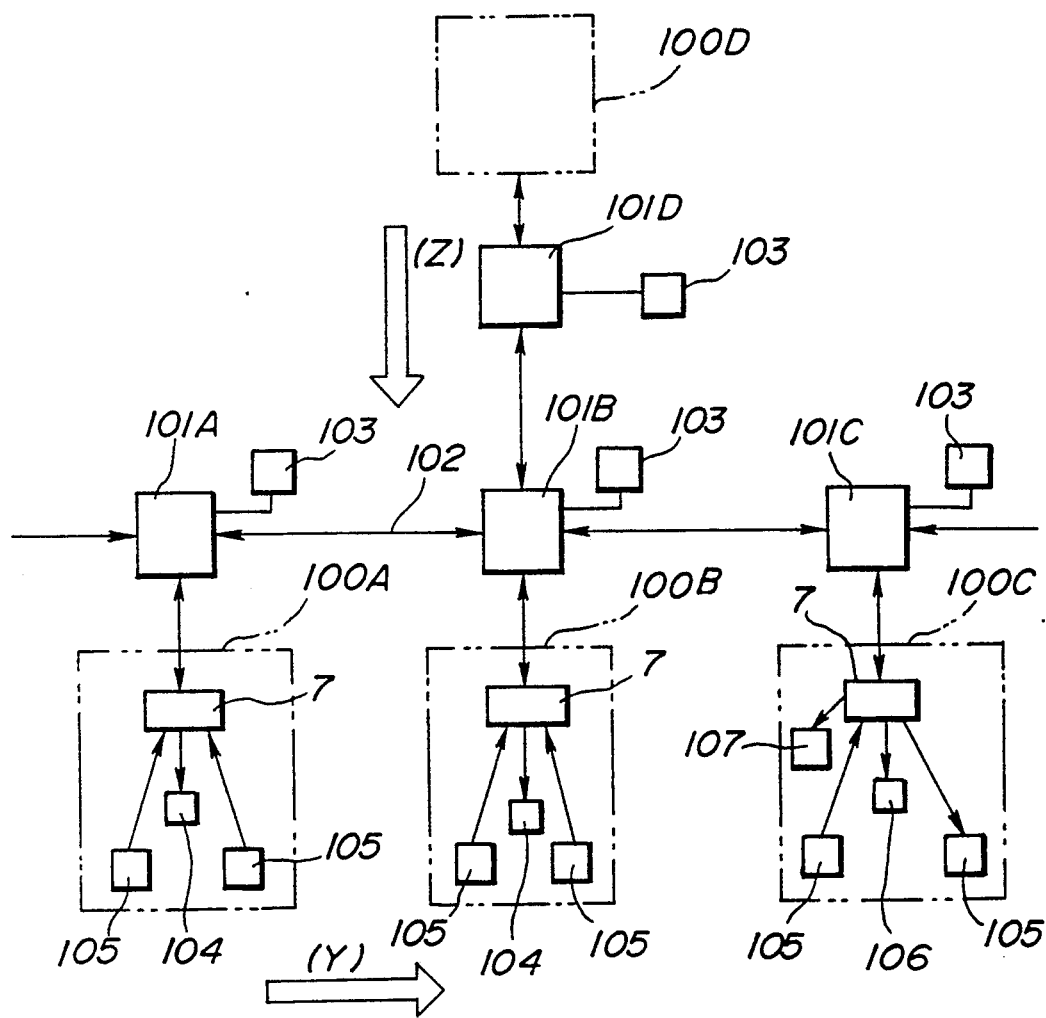
FIG. 7 is a schematic diagram to show the elements of the interlock display screen provided on automated machines.

FIG. 7 shows a practical example of interlocking of the automated machine units controlled by the type of arrangement shown in FIG. 1.

This line shows a case of performing processing operations on work objects moving in the direction of an arrow labeled Y, and of assembling the work objects moving in the direction of an arrow labeled Z.

In this arrangement, the work objects are subjected to various processing steps within the processing machine units 100A and 100B (called p-machine units) and by the discharging facility 100C. Such work objects are then assembled to other work objects coming from the processing block 100D moving in the arrow Z direction.

The p-machine units 100A-100D are controlled by master controllers 101A-101D, which can communicate with one another through the cable 102. The numeral 103 refers to CRT for displaying information for controlling the operation.

The master controllers 101A-101D generate control signals to control the actions of the various operating devices 104 such as motor, solenoid etc. shown in FIG. 1 and receive indicating data from the various sensors 105 including limit switches SL.

In the case shown in FIG. 7, the sensors 105 for p-machine unit 100A are limit switches for the lowest position of a lifter and for the rearmost edge position of a transfer (T/F) mechanism.

The sensors 105 for the discharging facility 100C are limit switches for the conveyor (C/V) which are activated if a work object exists on the C/V. The discharging machine facility 100C is further equipped with actuators 104, a motor 106 and a receptor 107 to support the work object on the conveyor. All of these sensors and limit switches are also controlled by the master controller 101C.

Next, the details of the interlock display screen C are explained with reference to FIG. 8.

An interlock display is brought on to the CRT C, as needed, during the process of confirming the startup conditions for example in preparation for operational mode setting. That is, the line startup is possible only when all the conditions of the various machine units are fulfilled.

However, when certain groups of machine units are not operable, it may be necessary to call up the interlock screen to check whether the machine units are interlocked.

Figure 8:
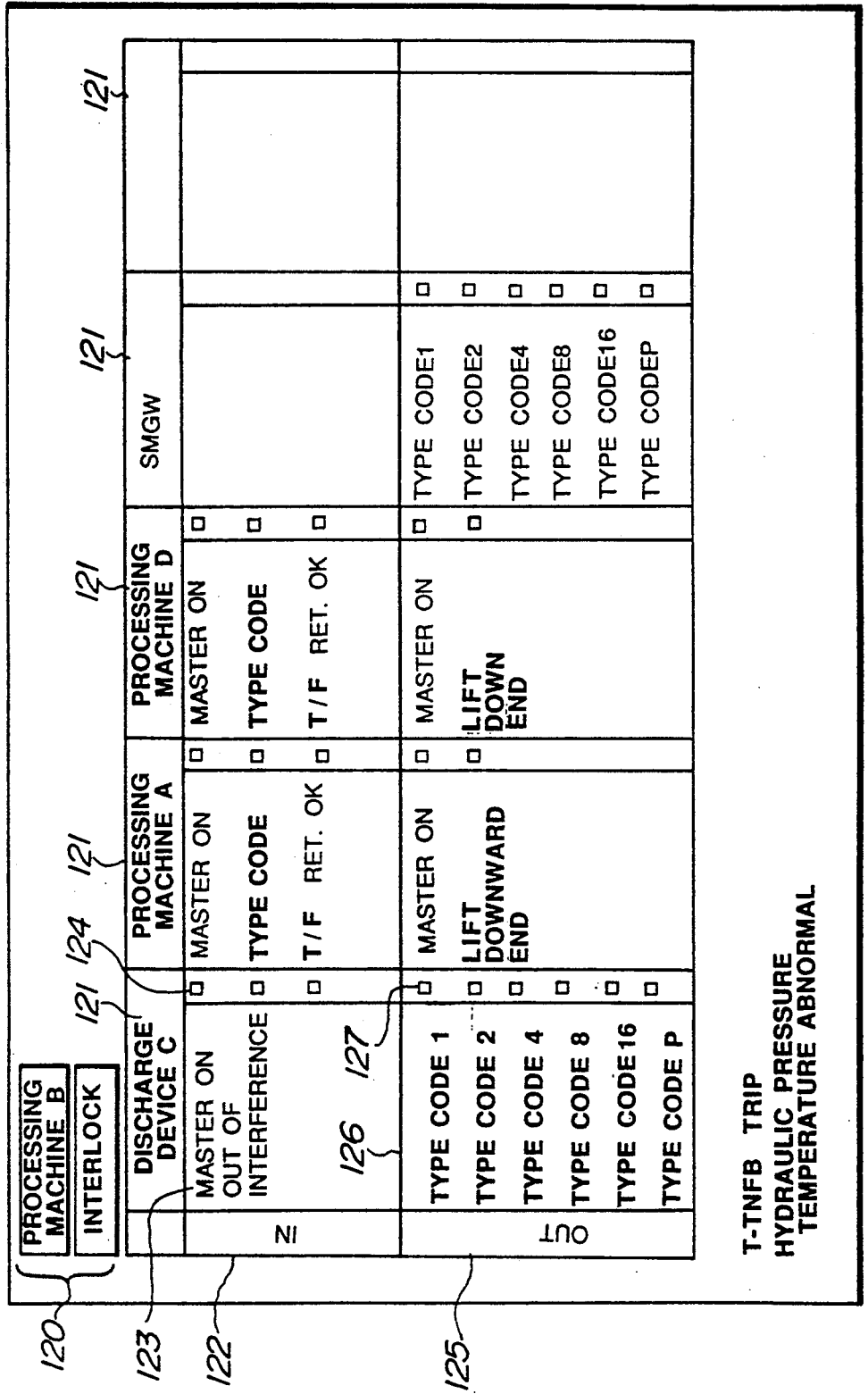
FIG. 8 is a front view of the interlock display screen.

In FIG. 8, the numeral 120 refers to the display spaces for showing the display screen name (Interlock) and for the machine unit (p-machine 100B), which can be displayed by calling up the interlock display screen C.

The numeral 121 refers to those machine units which are interlocked with the particular machine unit displayed in the portion 120. In the figure, they are shown to be a multiple of discharge machine facility 100C, p-machine units 100A, 100D.

Below the display portion 121 is a display portion 122 which displays interlock "In" to indicate those machines which are being interlocked with the machine shown in display portion 121. A display portion 123, which relates to both display portions 121 and 122, conditions for the component to become interlocked (i.e., the name of the sensor which is causing the machines to interlock).

As shown in the example of FIG. 8, the conditions display portion 123 provides for a number of potential interlock reasons for p-machine units 100B, such as "No Work Object on "C/V" and "Master On". When an interlock condition does not exist, the display portion 124 is litup. If it is not litup, the operator recognizes that said interlock is operating.

To summarize, the interlock conditions for p-machine 100A are as follows:

(1) No work object on conveyor of discharge machine units 100C.

(2) Operational preparation for p-machine units 100A and 100D are ready, the machine types are identical.

(3) Transfer is a the rearmost position.

Additionally, below the display portion 122 which displays conditions for interlock "In" is another display portion 125 which displays relevant conditions for interlock "Out", for example for p-machine unit 100B, the display portion 126 which shows the designations of the interlocking sensors attached to this machine unit, and the display portion 127 which shows the interlocking status for the various sensors.

Further, with respect to discharging facility 100C, there is an interlock sensor to detect the presence of a work object for the receptor 106 which is provided on this facility. Therefore, the receptor must be readied for the correct type of work object, and for this reason there is an interlock logic for the p-machine unit which is sending the work object to the discharging facility 100C. This is accomplished by assigning a code number for each of the p-machine unit, in this example case 100B, and this machine-type code number is an entry condition for Interlock-in for the machine unit 100C.

As shown in FIG. 8, the code numbers are given by multiples of two, 1, 2, 4, 8 and 16 and so on up to five digits. The five-figure code number and machine-type are displayed together in display portion 126, opposite to the corresponding check spaces 127. There is an additional condition called parity-check P which serve to identify the correct machine code, in conjunction with the machine-type code numbers in the following way.

For example, if the machine-type code numbers 1 and 2 are litup together with the parity-check P then the correct machine code is 3 while if machine-type code numbers 4 and 8 are litup but the parity-check P is out, then the correct machine code number is 12.

With respect to p-machine units 100A and 100D, the corresponding display portion 126 displays the following information.

(1) The conditions which result in interlocking of the p-machines 100A and 100D with p-machine unit 100B, i.e., to prepare p-machine 100B for operation, the indicated conditions must be corrected.

(2) The lift provided on p-machine unit 100B is at the lowest position a indicated by the limit switch 105.

(3) The display portion 127 which lights up when the restrictive conditions (1) and (2) are removed.

To callup Interlocking Display Screen, the following operations are necessary;

(1) activate the display changing switch (not shown) provided on the control panel 2 when the line would not startup, (2) specify the machine unit (in the example, 100B) which requires interlocking to be removed, then the interlock display screen shown in FIG. 8 appears on the screen.

This interlocking display is activated when the master controller decides that the line startup is not possible because one or more of the machine units which are being interlocked for not satisfying all the necessary conditions.

Then, the master controller 6 supplies data to the display controller 4 regarding the designations of the locked-up machine unit, the associated interlock-in conditions, and the corresponding checks for releasing interlocking.

The display controller 4 controls functions of CRT 3 to display information on the designations of the interlocked machine unit and of the interlock conditions in the display portion 123, as well as the confirmation of checks for removing interlocking in the display portion 124.

When the machine remains interlocked, the interlock conditions are removed by the operator by removing the work object or by moving the conveyor, for example, thereby correcting the source of interlock problem. When the sensor detects that the object has been removed from the conveyor, the display portion 124 is litup to inform the operator that the interlock problem has been corrected.

If there is a large number of interlock problems which exceed the display capacity of the displays portion 121, then a rule is invoked to display a capacity number of problem designations starting from a defined location, for example, from an upstream location on the CRT 3.

The designations which are not shown on the current screen can be accessed by scrolling or page turning by means of appropriate switches (not shown) provided on the control panel 2.

Meanwhile, the master controller 6 searches for interlock "Out" data relevant to the concerned machine unit, and transmits the data to the controller 4 to be displayed on the CRT 3.

Therefore, by viewing the interlock "Out" display the operator is able to identify the machine units which are being interlocked with the machine unit 100B to cause disabling of the unit 100B.

With respect to the function of interlock "In", if there is a problem with machine unit 100A, for example, to cause the machine unit 100B to not perform specified operation, then by accessing interlock "In" display for the machine unit 100A (display portion 120), the operator is able to further search for the cause(s) of disabling of the unit 100B, for example, to move the unit B to the rearmost edge of the transfer.

Product-Type Display Screen D

FIGS. 9 and 10 show an example of product-type display screen D

In these figures, the numeral 111 refers to station display column to display the station reference numbers (designations of the machine units) associated with the line. In the station display column 110, there is a dimple portion 111 to display the names or abbreviations for the machine units 5a–5i which comprise the line. In this preferred embodiment, there are three stations containing a machine unit each, therefor, the station designations are machine units 5a, 5b and 5c.

To the right of the display column 110, there is a setup display column 112 which displays process modes (classification designations of operational modes according to various combinations of product types, destinations/derivations and materials).

In the setups display column 112 is a display portion 113 to display setting modes (designations C3 and C4 etc. in the example shown in FIG. 9) to oppositely correspond with the display portion 111.

To the right of the setups display column 112 is a machine-type display column 114 to display the designations of the machine units being employed to produce current work object.

In the product-type display column 114 is a display portion 115 oppositely corresponding to display portion 111. To the right of product-type display column 114 is information, in addition to those regarding the product type, to further characterize the processing nature of the work object, i.e., a display portion 117 of the derivations column 116, a display portion 119 of the material column 118 and a display portion 121 of the remarks column 120.

Therefore, the product-type display screen is a summary table which provides important processing modes information such as product types (e.g. model of automobiles), derivations (domestic or foreign) and materials (information necessary to control process tasks e.g. welding current).

Figure 11:
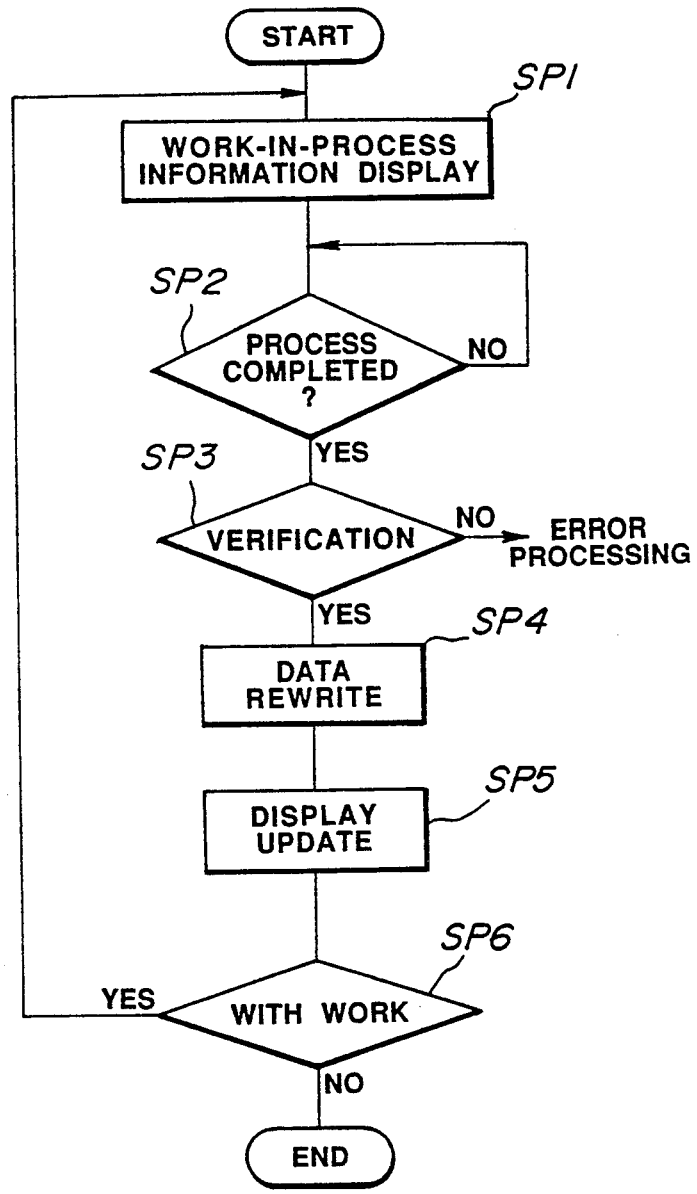
FIG. 11 is a flow chart to show the sequence of steps for verification and display control.
Figure 12:
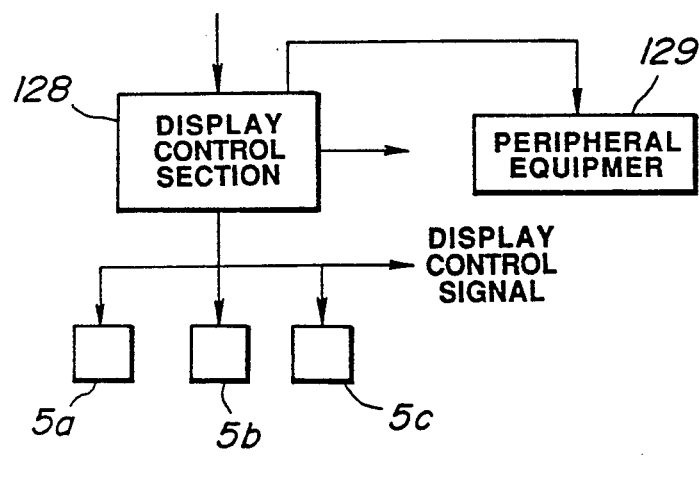
FIG. 12 is a block diagram to explain the process of transfer of information.

Next, the steps necessary to use the product-type display are explained with reference to flow chart shown in FIG. 11. In this illustrated example, the work objects are designated by C3, C4 etc., which identify the type of processing specified by the operation modes, are moving in the line as shown schematically in FIG. 12, to be subjected to various .

STEP 1

As shown in FIG. 9, for each of the stations 5a, 5b and 5c, names or designations are shown in display portion 111. For each of these stations, or machine units in this case, the work to be performed are specified by the designation as C4 for machine unit 5a, C3 for machine unit 5b and C5 for machine unit 5c. There are additional characterizing information for each station, such as product-type display column 114, derivations display column 116 and materials display column 118. In the setups display column 112 are displayed appropriate process mode number oppositely corresponding to the foregoing information.

STEP 2

Idling to wait the completion of processing at the machine units 5a, 5b and 5c. The completion of a cycle can be recognized either by the programming steps or by the actions of sensors to detect the movement of the work object transferring in and out of their own boundary region.

STEP 3

The process code number n of the work object closest to the first machine unit 5a (15 in FIG. 12) is compared against the processing number n (15) given to the work object according to the planned processing program. The CPU 4 and CPU 6 shown in FIG. 1 issue mode command instructions to control the actions of the appropriate machine units 5a, 5b and 5c.

The CPU 4 and CPU 6 also perform the function of display control for display control section 128 (refer to FIG. 12) which supplies control signals to the display screen CRT 3, and the existing information is replaced with the subsequent processing instruction data (i.e., 5b repeats 5a operation and 5c repeats 5b operation) are entered into each of the respective machine units 5a, 5b and 5c to renew the display.

The displayed information is compared against the process instructions supplied by the machine units 5a–5c to be applied to 5b and 5c, with the status report of the respective machine units which are to respond to the instruction, and if there is a mismatch in any one information, the path opts to error.

The step is further explained below. Regard to the machine unit 5a which is in the uppermost location in the process flow stream and which is accepting a work object (15 in FIG. 12) coming in from a neighboring station (i.e. the work object which is in the lowest position in the previous process step), the operational mode information on the work object contained in the upstream-computer is compared against that given to the work object in the current machine unit 5a. The path is allowed to proceed to the next step only when the two groups of data match, i.e. verification procedure is satisfactory; if the information does not match, the path opts to error which is so displayed.

To summarize the functions of the display control 128:

(1) as a work object passes from an upstream station to a downstream station (5a), the process information necessary for the work object is transmitted to the downstream computer in the correct sequence with the flow of the work object, and (2) it performs a verification procedure by comparing the operational mode of the machine unit 5a based on the above information with the information stored in the instruction set contained in the machine unit 5a, (3) the verified information is forwarded to the downstream machine unit 5b/5c, and (4) it performs confirming checks on the next operational mode and repeats the above process. If the there is a discrepancy in the flowing information, then it opts to error. This will be further explained later. In the above case, it is also possible to compare the process codes "n" assigned to the machine units 5a/5b (in FIG. 12, 15/14/13) with the process code "n+1".

STEP 4

The operational modes (C5/C3) assigned to the machine units 5b/5c for the work objects "n−2" to "n−1" (i.e. 13 and 14 in FIG. 12) are repeated for the work objects "n−1" to "n" (i.e. 14 and 15).

The above process can be carried out in the memory sections of either the master controller 6 or the individual controllers associated with machine units 5a, 5b and 5c in various ways:

(1) by shifting the information successively from upstream machine units to downstream machine units;

(2) by forwarding information on the work objects from the upstream computer to downstream controllers, provided that the comparison check steps are satisfied. The memory contents of the display CRT 3 (provided in CPU 4 for example) such as model type, derivations and materials data for the nth work object are replaced with those for the "n+1" work object.

STEP 5

Based on the latest data regarding the operational modes, model types, derivations and materials, the information in the display column 112, 114, 116 and 118 are renewed, resulting in a change of the screen display from FIG. 9 to FIG. 10.

STEP 6

The path returns to STEP 1 when a work object is present in a machine unit 5b which is one step upstream from the machine unit 5c; if it does not, then the program terminates.

By following the above described sequence of events, the processing is carried on for the work objects 15 to 17, 16 to 18 and in general, "n" to "n+2" work objects.

As described above, by sequential shifting the work object data from upstream machine units 5a, 5b and 5c to downstream machine units and displaying them on CRT 3, it becomes possible to visually check whether or not the operational modes of the machine units are appropriate for the work objects being processed currently.

In STEP 3 above, when the path opts to error, the display shows: for example, (1) "switching mismatch" or "product-types mismatch" and (2) the operator is alerted by sounding alarms, for example, provided separately to take corrective actions by manually operating the switch (not shown) provided on the control panel 2. An alternative response action is to stop the line.

Abnormality List Display Screen E

The contents of the abnormality list display screen E are explained with reference to FIGS. 13 and 14.

FIG. 13 shows various stations in the entire line while FIG. 14 shows various processing machines provided in individual station The entire line display screen consists of the station display portion 150 to display the problem station (T/F, ST 1 and ST 2 etc.) and a litup listing to indicate the problems, according to three broad classification levels depending on the seriousness of the problem. The listing consists of "immediate stop" 151, "one cycle stop" 152 and "alarm" 153.

"Immediate stop" refers to an emergency situation in which it is not possible to continue the operation of the machine units 5a-5i.

"One cycle stop" refers to a situation in which the problem machine units 5a-5i must be stopped after a cycle has been completed.

"Alarm" refers to an alarmed situation, by sound or lighting, in which an unusual situation is detected but it is not necessary to stop the machine units 5a-5i.

When CPU 6 detects, for example "immediate stop" or "ST 1" indicating a problem in a station, the it displays as shown in FIG. 14, the individual station display portion to show what problem has actually happened in the station.

Switching to problem mechanism display from problem station display is accomplished by operating the switch (not shown) provided on panel 2, but it is not necessary to restrict to manual switching. It can be arranged so that the switching occurs automatically after a lapse of a certain period.

Preferred embodiment of the "problem mechanism display" is explained in more detail with reference to FIG. 14.

In this display, three columns are provided to correspond with three situations referred to in FIG. 13, that is, "immediate stop", "one cycle stop" and "alarm".

When an abnormality is detected, a problem item or items are displayed for each station, according to the three levels of emergency situations "immediate stop" 154, "one cycle stop" 155 and "alarm" 156. FIG. 14 shows an example of station 1 experiencing problem.

Some examples of "Immediate Stop" problems in Station 1, such as "Emergency Stop", "Sequencer Abnormal" and "Welding Source Abnormal" items are shown in FIG. 14 in display portion 154.

Some examples of "One Cycle Stop" problems such as "Trans(former) Thermo(stat) Abnormal" and "Hydraulic Pressure Thermo Abnormal" items are shown in display portion 155.

An example of "Alarm" problems is "Sequencer Battery Abnormal".

When "LS (limit switch) Abnormal" under the heading of "Immediate Stop" is displayed, the screen can be switched manually to "Status Display Screen F", shown in FIG. 15, by operating the switch provided on panel 2. This screen shows the names of various limit switches and lights up those switches which are inoperative.

The details of FIG. 15 are further explained in the following.

The numeral 160 refers to display portion to show that the display refers to "status display", 161 refers to the names of the automated machine units and 162 refers to the names of the mechanisms of the machine units. In this table, "set jigs" and "Transfer" are shown in the display portion 161.

Adjacent to the display portion 162 are shown display portion 163 which shows "ON or OFF" of the original position SOL (solenoid) switches and display portion 164 which shows "ON or OFF" of the limit switches corresponding to each of the mechanism.

Adjacent to the display portion 164 are shown display portion 165 which shows "ON or OFF" of acting-position SOL and display portion 166 which shows the equivalent status of the limit switches.

The limit switches shown in this figure refer to such switches attached to such mechanism as cam plates and ejectors.

The above "status display" is essentially the same as that shown in FIGS. 16 and 17 which will be explained in further detail. The only difference is the names of the mechanism which are shown in the display.

The switching operations between the FIGS. 13 with 14 and those between the FIGS. 15 and 16, which are prompted by selectively lighting up the relevant problem display portions by turning ON switch, are performed by the display control memory section (not shown) of the CPU 6.

Further, as described earlier, switching of the displays between FIGS. 14 and 15 is performed manually, but it can also be performed automatically after a lapse of a given time.

The above described screen display functions of the CPU 6 are summarized as follows:

(1) according to the signals from the sensors S1 and S2 or limit switches LS, the controller recognized whether or not there is a problem in the line, and if a problem is confirmed, it is displayed on CRT 3, as a "problem station" display a shown in FIG. 13.

That is, the name of the station experiencing problem and the nature of the problem classified, according to the urgency of the problem, "immediate stop", "one cycle stop" and "alarm", are displayed, (2) by operating the switch on panel 2, the names ("immediate stop", "one cycle stop" and "alarm" of the potential problem items are displayed as shown in FIG. 14, and (3) by operating the switch once more, the names of the actual malfunctioning mechanisms are displayed on the screen.

Accordingly, when abnormal conditions occur in various lines, the abnormality displays can provide;

(1) visual confirmation of the problem by switching the displays from FIG. 13 to 14 and from 14 to 15, (2) immediate identification of the severity of the problem as a result of the graded display system and (3) immediate response to the problem.

Because it is possible to continuously identify the source of the problem quickly and without actually going to the problem site, the system allows a very quick corrective response to correct the source of the problem. In the case described above, various reports are displayed on one CRT 3, but it can be arranged so that a multiple of display devices can be used to display the reports shown in FIGS. 13 to 15.

Further, the CPU 6 can be made to choose from a set of pre-designated definitions (such as "overall line", "stations" and "status") to display the one designation which applies to an abnormality and use the rest of displays for other purposes.

Further, display means is not restricted to CRT, but a lighted display panel involving a light and a set of worded panels, for example "stations", "immediate stop", one cycle stop" and "alarm", can be arranged so as to light appropriate panels in case of problems.

Status Display Screens F

Next, status display screen F will be explained in detail in reference to FIGS. 16 and 17.

FIG. 16 shows the status display of a MSR jig A provided in an automated machine, and FIG. 17 refers to the status display of a hanger transfer machine.

In this figure, the numeral 200 refers to the space for displaying the name of the automated machine and the numeral 201 is that for the various components which constitute said machine.

Adjacent to a display portion 201 is a display portion 202 which shows the "ON/OFF" status of the original position SOL, and a display portion 203 which shows the operational status of the limiting switch LS in its original position.

Opposite to the display portion 201 is a display portion 204 which shows "ON/OFF" status of the acting-position SOL, and a display portion 205 which shows the status of the acting-position limiting switch LS.

The CPU 6 generates a display command signal to CPU 4 to control display function of CRT 3 to indicate which motors M and solenoid SOL have been activated by signals from the control panel 2 to operate the actuator and its associated motors and solenoids. The identified SOLs are litup in the display portions 202 and 204.

Further, the CPU 6 receives signals from sensors S, limit switches LS provided on machine units 5a-5i to indicate their positions and generates command signals to CPU 4 to control display function of CRT 3 to indicate which sensors S and limit switches LS have been activated. The identified LSs are litup in the display portions 203 and 205.

In the case shown in FIGS. 16 and 17, when the display portions 202 to 205 are not litup, corresponding circuit numbers are displayed.

In these figures, the display portions shown by the numerals 206 and 207 refer to operational display screen number, and the numeral 208 refers to model types.

This case referred only to solenoids SOL and limit switches LS, but it should be noted that the same process described above applies equally well to motors and sensors, and the corresponding circuit number can be made to display in cases of malfunction.

Further explanations on the use of the status displays are provided below in the case of using cylinder mechanisms as actuators to drive the machine units 5a-5i.

The cylinder mechanism consists of a piston 211, which is freely movable inside the cylinder 210 and which is connected to the end of the machine units 5a-5i rigidly through a rod 212. The piston 211 moves in the direction shown by an arrow X-Y, according to the fluid motion directed by pump P into the two separate sections 213/214 divided by the piston 211.

That is, in between the sections 213/214 and the pump P for supplying the fluid, and the exhaust section EX for discharging the fluid is a flow valve 215 to direct the fluid flow selectively into and out of the section 213/214.

The flow valve 215 is equipped with solenoids SOL (A/B) to switch the fluid flow direction. Near the path of the rod 212 are located limit switches LS (A/B) which are operated by SOL (A/B).

In this arrangement, when the solenoid SOL (A) is ON the SOL (B) is OFF, and the rod 212 is in the position (acting-position) to activate the limit switch LS (B).

Conversely, when the solenoid SOL (B) is in ON the SOL (A) is OFF, and the rod 212 is in the position (original position) to activate the limit switch LS (A).

Figure 18:
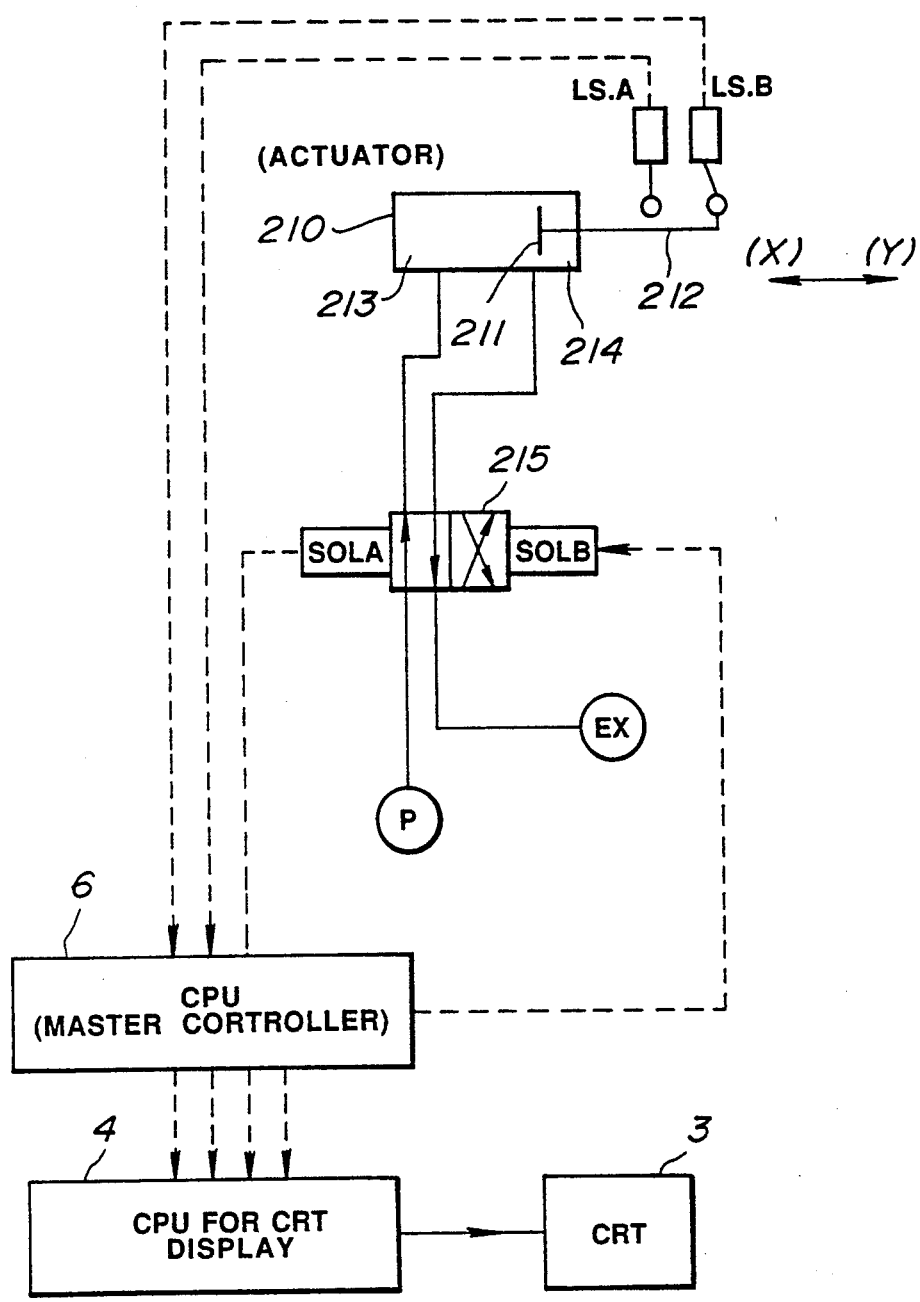
FIG. 18 is a schematic diagram to show the components of an actuator.

This is further related to FIGS. 16 showing "status display" and to FIG. 18 showing the actuator construction as follows: assuming that the actuator mechanism corresponds with the "clamp shift" mechanism shown in FIG. 16, then when the SOL (A) is ON and the corresponding SOL is litup:

(1) the rod 212 moves in the Y-direction, and the limit switch LS (A) is OFF, and (2) in FIG. 16, the original position display portion is not litup for LS (A) while (3) the limit switch LS (B) is ON and (4) the acting-position LS (B) is litup in the display portion In this arrangement, if appropriate display portion of the LS (A) and LS (B) is not litup or off, there is an abnormality in the system.

The status display report shown in FIG. 16 is a result of:

(1) operating the actuator through either solenoid SOL (A) or (B), and (2) having either the limit switch LS (A) or (B) ON.

Therefore, if in spite of the litup display for the clamp shift, the required ON display for the limit switch LS is not litup, then it can be determined that there is a problem (malfunctioning of the actuator or inappropriate action of the automated mechanism).

Therefore, by observing the status displays of FIGS. 16 or 17, it is possible:

(1) to determine whether or not the actuator is operating correctly or the components of the automated mechanism is operating correctly, and (2) to inspect the operative sequence rapidly by observing the circuit numbers litup in case of problem, and (3) to take quick corrective actions for the line according to the information of (1) and (2) above, in case of problems by rapid identification of the problem spot.

In the example provided in these figures, in cases of problems, it is arranged to have circuit numbers displayed, but it should be noted that blinking of the displayed information has some merits because it can aid in alerting the operator of the problem.

The circuit number can provide further advantages when they are placed on on-site machine units so that the maintenance staff can speedily identify the problem units to correspond with the circuit number displayed on the abnormality/emergency display screen.

Step Monitor Display Screen G

Figure 19:
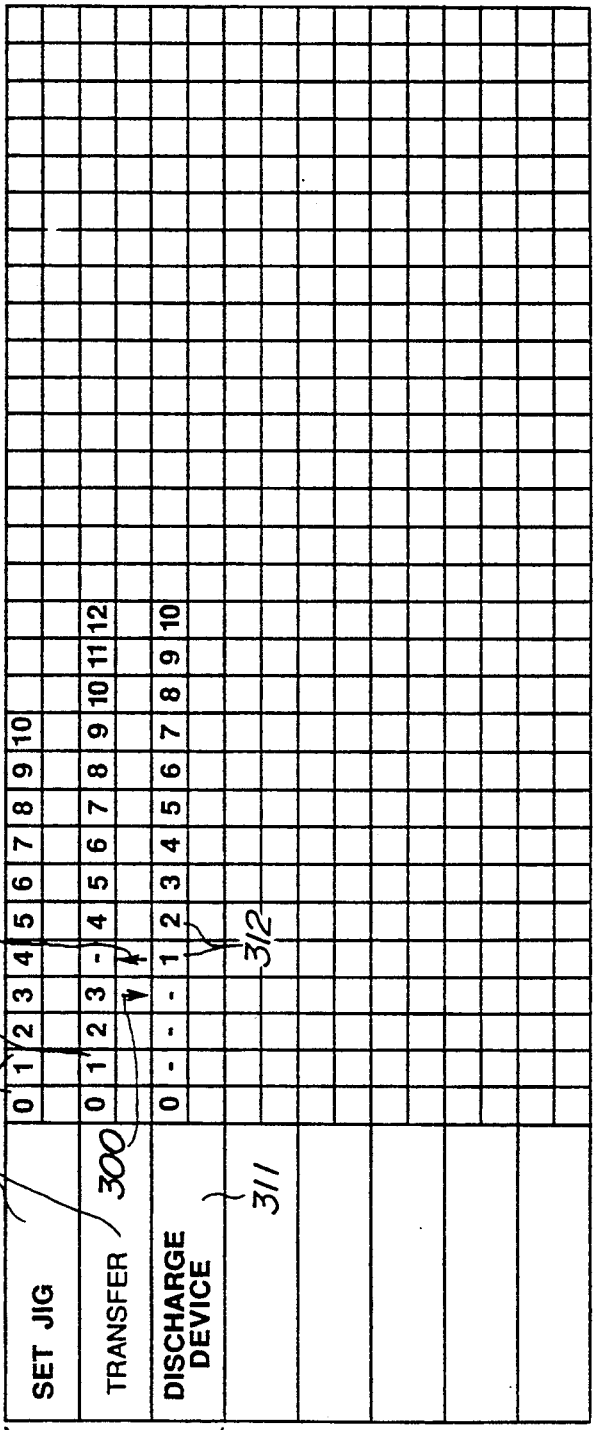
FIG. 19 is a front view of the step monitor display screen.

The details of the step monitor display screen G are explained in reference to FIG. 19.

As shown in FIG. 19, this screen displays process step numbers, from 0, 1, 2, 3 and so on, associated with the various automated machine units (unit processing step referred to in claims), such as "Set Jig", "Transfer" and "Discharge Mechanism".

For example, if "Set Jig" unit is performing Step 1, the display portion corresponding to "1" is litup, and if "Transfer" unit is in Step 3, then the display portion corresponding to 3 is litup. The operator is able to identify immediately where the process is hung up when an emergency situation arises.

In FIG. 19, the numeral 310 refers to a display portion to show the title "Step Monitor", the numeral 311 refers to the name of the automated machine unit, the numeral 312 refers to step number and the numeral 300/301 refer to interlock display portion.

In FIG. 19, there are arrows 300 and 301 pointing to "discharge mechanism" and to "Transfer", respectively, which indicate the two machine units are operatively interlocked. In reality, the arrow points to the step which can only be performed after completing the step from which the arrow originated.

In detail, the process works as follows:

(1) in the case of arrow 300, the "Transfer" unit must complete the steps 2, 3 of before step 1 of the "discharge mechanism" can be started, and (2) in the case of arrow 301, the "discharge mechanism" must complete the steps 0 and 1 before step 4 of the "Transfer" unit can be started.

When the process flow stops, the operator is able to identify immediately the machine unit and the step number responsible for the problem by referring to the step number.

Unit Stepping Monitor Display Screen H

The details of the unit stepping display screen H are explained in reference to FIG. 20.

The step monitor display shows the following information:

(1) the step numbers for a machine/process unit in accordance with its operational sequence (refer to numeral 410), and (2) in each step, the status of the driving signals to operate various process mechanisms (solenoid SOL, electric motor M) and the status of the detection means (sensor S and limit switches LS) to detect that the required operation has been performed. The numerals 411 and 412 refer respectively to display portions to show "output status" and "input status".

In practice, when a driving signal to perform the step of "carrier forward, ST loader rotation" is issued in step 1, for example, the light 411A is litup to acknowledges that the signal has been generated. The light 412A is litup, in step 2, when the detecting means acknowledge that the specified actions have been performed.

Next, the details of the steps of CPU 6 to control the display screen CRT 3 are described.

The CPU 6 performs the following two functions (1) and (2) according to the input signals from the control means such as control panel 2 and detection means such as sensors S and limit switches LS.

(1) According to the signals from the control panel 2, CPU 6 displays on CRT 3 "Step Monitor Display" shown in FIG. 19 or "Unit Stepping Display" shown in FIG. 20 either individually or together.

(2) The CPU 6 issues command signals to machine units 5a-5i to provide the stepping information, as shown in the output display portion in FIG. 18, in accordance with the signals generated by the sensing means such as sensors S and limit switches LS. The CPU 6 then controls the process of the machine units 5a-5i so that after the completion of the step "N" the next step "N+1" is performed.

The stepping process shown in FIGS. 19-20 is explained further in reference to the flow chart shown in FIG. 21.

(1) In Step SP1, the startup signal is generated, and (2) the stepping number N is set to 1, in Step SP2, and (3) Step SP3 (explained in detail later) follows, and (4) in Step SP4, appropriate driving signal is generated to correspond with the Step number N, for example, and lights up an indicating light, for example, 311A in FIG. 18 or 350 in FIG. 19, and (5) in Step SP5, the step number N is incremented by 1, and (6) in Step SP6, it is checked whether the machine units 5a-5i have completed the process as specified from the signal from the detection means, and if it is Yes, then (7) Step SP7 is reached, and (8) an indicating light is litup, for example, 312A in FIG. 18.

(9) If in the foregoing Step SP6, if the machine units 5a-5i do not operate, i.e., after a certain time period the machine units 5a-5i are not operative as judged by the output signals from the detection means, then the flow takes the "NO" path and the operator is alerted that an abnormality in the form of unit stoppage exists. In the flow chart, this is shown as Step SP8.

Further, in between the steps SP2 and SP4, there is a Step 3 which is concerned with whether all the required steps, assigned to the relevant machine unit, have been performed; and if the answer is Yes then one cycle has been completed.

According to the step monitor display screen as shown in FIG. 19, which shows the stepping number of all the relevant unit/process such as "set jig", "Transfer" and "discharge machine", if a unit/process should stop, then it is possible to identify at what step the unit/processes is hung up.

Further, as shown in FIG. 20, because all the details of the steps of the relevant unit/process are shown in terms of the driving and detection signals, it becomes possible to immediately identify where the unit/process is hung up and due to what reasons.

For example, in FIG. 20, if the indicating light 412A is not litup in Step 1, in spite of the fact that the indicating light 411A is litup (to indicate that the driving signal has been generated to perform the step of "carrier forward and rotate the 1st loader") in Step 2, then the sensor signals to detect the forward movement of the carrier and the rotation of the first loader, are absent indicating that the signal from said sensors has not been generated, then it can be concluded quickly that problems exist in the sensor mechanisms, and corrective actions can be commenced immediately.

In this case, CPU 4 is providing a controlling function for CRT 3 display under the direction of CPU 6, and is performing a part of the controlling functions of CPU 6.

In Step 7 of FIG. 21, the indicating light (for example, numeral 350 in FIG. 17 and 321A in FIG. 18) is set to light up when the machine units 5a-5i performed specified activities, but it can be set so that the indicating lights are litup when the specified activities are not performed. It is also possible to set the indicating lights to blink.

According to the invented system of monitoring the line, the line operator can easily and quickly recognize and access the source of line malfunctioning by orderly search for the problem, starting from the group surveillance display screen, to status display screen, to one cycle display screen G and ending in unit stepping display screen H to pinpoint the source of the problem.

Additionally, the monitoring system is highly manageable because it is easy to operate.

Accordingly, the invented monitoring system provides quick and efficient information on the operating conditions of an automated production line having a complex and varied set of process steps. Further, the monitoring system is highly manageable by an operator who is not thoroughly familiar with every detail of the processing steps, including quick identification of problems and potential remedial steps required. Therefore, the invented monitoring system is superbly adaptable to improving the productivity of complex production operations.

What is claimed is:

1. An automated production line monitoring system, wherein a work object flows from upstream to downstream in a production line consisting primarily of a plurality of successive processing stations, each of said stations having a plurality of automated machine units to perform a series of processing operations on said work objects, said monitoring system having;
(a) detection means for determining the operating status of said machine units in a current station,
(b) controlling means for processing data supplied by said detection means, and
(c) display means for displaying processed data supplied by said controlling means, said display means comprise:
(d) a group surveillance display screen consisting of displays for a group of machine units in said station,
(e) a status display screen to monitor the operating conditions of said machine units,
(f) a step monitor display screen to display assigned numbers for specific operational processes currently being performed on said work object on said machine units in said station, and
(g) a unit stepping display screen to display detailed processing steps constituting said processes;
said display screens (d), (e), (f) and (g) can be switched from one to another;
(h) by operating first switching means for switching from a specific machine unit of said group surveillance display screen to a status display screen of said specific machine unit,
(i) by operating second switching means for switching from said status display screen to a one cycle display screen of said specific machine unit, and
(j) by operating third switching means for switching from said one cycle display screen to a unit stepping display screen of said specific machine unit;
said group surveillance display screen further consists of:
(k) an operational preparation display screen to display the electrical power status, preparation conditions necessary for line startup, conditions necessary for line startup, and readiness for automated line operation, (l) an operational mode display screen to display a specific operational mode being utilized in the current station and the name of a corresponding control switch in a summarizing table, and (m) an interlock display screen to display a summary table showing the operational status of interlock signal transmission between interlocking machine units provided with interlocking sensors, (n) a product-type display screen to show the steps to be performed on said work object within the current machine unit, and (o) an abnormality list display screen to display a summary table identifying causes for abnormalities in the line.

2. The automated production line monitoring system as claimed in claim 1, wherein said control means is provided with:

a setup decision means for determining that all operational modes of said machine units are operational; and said operational mode display screen is provided with:

a control switch display column to show the names of the operational modes and the status of the switches corresponding to said modes, and a display portion showing the operational data from said setup decision means to correspond with the name of control switch displayed in the control switch selection display column.

3. The automated production line monitoring system as claimed in claim 1, wherein said abnormality list display screen further having:

(p) an entire line display screen comprising a station display portion to display problem stations and a classified problems list portion to classify problems in three groups depending on the nature of a problem, (q) an individual station display screen to show a list of the names of problems classified according to said three groups, and (r) a status display screen to show the operating status of processing machines provided on said machine units disposed in said station.

4. The automated production line monitoring system as claimed in claim 1, wherein said step monitor display screen further having; a step number display portion showing all the automated processing steps involved in a group of processing operations, and arrow display portions to indicate the interlocking relationship between said automated processing steps.

5. The automated production line monitoring system as claimed in claim 1, wherein said unit stepping display screen further having: a stepping number display portion showing the processing steps assigned to each machine unit in the order of increasing stepping numbers, and an output display portion to display the status of activating signal output to each operational mechanism disposed on said machine units, and a stepping condition display portion to display the status of detection means for determining the operational status of said mechanisms.

6. The automated production line monitoring system as claimed in claim 1, wherein said operational preparation display screen has a lightup feature whereby a display space for an automated mechanism can be highlighted, to indicate that it is operative, or not highlighted, to indicate that it is inoperative; and when a condition display is not litup, said operational preparation display screen further displays a circuit number, corresponding to said mechanism, opposite to said display space.

7. The automated production line monitoring system as claimed in claim 6, wherein said highlight is a blinking highlight.

8. The automated production line monitoring system as claimed in claim 6, wherein circuit numbers are provided for each and every one of the automated mechanisms operatively attached to said machine units.

9. The automated production line monitoring system as claimed in claim 1, wherein said status display screen displays and highlights the original position status of automated mechanisms operatively attached to said machine units: wherein a display portion shows the names of automated mechanisms operatively attached to said machine units, another display portion shows "ON/OFF" status of solenoids operatively attached to said machine units, still another display portion shows acting status of limit switches operatively attached to said machine units, wherein the names of the individual solenoid and limit switch which are not litup are alternatively indicated by their respective circuit numbers which are displayed in a display portion opposite to the corresponding name which is not litup.

10. The automated production line monitoring system as claimed in claim 1, wherein said detection means comprises a plurality of sensors which detect abnormality of automated mechanisms operatively attached to said machine units, and said control means comprises:
(a) decision means for deciding the presence of abnormality according to the status of output signals from said detection means,
(b) classification means for grading abnormality according to a standard, and
(c) display means for showing the results of said classification in an abnormality list display screen.

11. The automated production line monitoring system as claimed in claim 1, wherein said control means has a control section to regulate:

the displays of progress status of processing steps on said step monitor display screen, and the display of output status of driving signals and the input status of detection signals on said unit stepping display screen.

12. The automated production line monitoring system as claimed in claim 1, wherein said detection means is provided on each one of said machine units to detect the presence of said work object and the operational status of said machine units, wherein said control means regulates the operational processes of said machine units based on data from other machine units operatively inter-connected with said machine units, and wherein said control means is further provided with an interlock display screen to show interlocking relationship with said other machine units in terms of the name and the detection means of said other machine units.

13. The automated production line monitoring system as claimed in claim 1, wherein said interlock display screen is provided with:
- a display portion to display the name of other machine units which are causing interlocking of said machine units, and
- a display portion to display the name of the interlocked sensors provided on said machine units.

14. The automated production line monitoring system as claimed in claim 1, wherein said detection means is provided with:
- a detection device to identify processing machines operatively connected to said machine units and to determine acting-positions of a plurality of actuators to operate automated mechanisms of processing machines,
- a display portion to show acting status of said actuators oppositely to acting-positions display of said automated mechanisms, and wherein said control means is further provided with:
- a control device to generate output signals to operate said actuators and to display the acting status of said actuators and the acting-position of said automated mechanisms.

15. The automated production line monitoring system as claimed in claim 1, wherein said product-type display screen is provided with:
- a product-type display portion showing for each machine unit detailed steps to be carried out on said work object,
- comparison means for performing a verification procedure of comparing current processing step procedure to be performed on said work object on a first machine unit, with second planned processing step procedure supplied externally to be performed on said work object on the same machine unit,
- decision means for deciding the completion of said processing step,
- memory replacement means for renewing the instructions contained in a downstream machine unit with the instruction contained in said first upstream machine unit, after said verification procedure is validated and said decision means decides the processing has been completed.

16. The automated production line monitoring system as claimed in claim 15, wherein said operational preparation display screen is provided with:
- an operational conditions display column showing the names of the conditions necessary for startup,
- a startup conditions display column, adjacent to said operations conditions display column showing the names of the conditions necessary for startup as such conditions become fulfilled.

17. The automated production line monitoring system as claimed in claim 15, wherein said operational preparation display screen is provided with a first readiness display means for indicating the completion of said verification procedure.

18. The automated production line monitoring system as claimed in claim 15, wherein said operational preparation display screen is provided with:
- an operational preparation condition display column showing the names of operational conditions necessary for startup,
- a startup condition display column, adjacent to said operational preparation condition display column, showing the names of automated mechanisms operatively attached to said machine units, and
- a directive display means for controlling manner of display wherein every time a startup condition is fulfilled said display means allows highlighting of corresponding condition.

19. The automated production line monitoring system as claimed in claim 18, wherein said operational preparation display screen is provided with a startup readiness display portion to show that the startup conditions have been fulfilled and the line startup is allowable.

20. The automated production line monitoring system as claimed in claim 1 wherein said control means is provided with operating conditions decision means for deciding startup readiness of said line based on data from said detection means and from display control means to allow display of operational mode display screen, after the decision means has completed a confirmation procedure that all the operating conditions are established.

* * * * *